(12) United States Patent
Kobayashi et al.

(10) Patent No.: US 12,455,203 B2
(45) Date of Patent: Oct. 28, 2025

(54) PRESSURE SENSOR APPARATUS HAVING A VISCOELASTIC SEPARATION LAYER BETWEEN A FIRST PRESSURE SENSOR AND A SECOND PRESSURE SENSOR

(71) Applicant: SONY GROUP CORPORATION, Tokyo (JP)

(72) Inventors: Ken Kobayashi, Kanagawa (JP); Kei Tsukamoto, Kanagawa (JP); Yoshiaki Sakakura, Kanagawa (JP); Tetsuro Goto, Tokyo (JP); Akira Ebisui, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 278 days.

(21) Appl. No.: 18/252,402

(22) PCT Filed: Jun. 10, 2021

(86) PCT No.: PCT/JP2021/022097
§ 371 (c)(1),
(2) Date: May 10, 2023

(87) PCT Pub. No.: WO2022/107369
PCT Pub. Date: May 27, 2022

(65) Prior Publication Data
US 2023/0408355 A1 Dec. 21, 2023

(30) Foreign Application Priority Data
Nov. 17, 2020 (JP) .................................. 2020-190916

(51) Int. Cl.
*G01L 5/165* (2020.01)
*B25J 19/02* (2006.01)
*G01L 5/22* (2006.01)

(52) U.S. Cl.
CPC ............... *G01L 5/165* (2013.01); *B25J 19/02* (2013.01); *G01L 5/226* (2013.01)

(58) Field of Classification Search
CPC ................................. G01L 5/165; B25J 19/02
See application file for complete search history.

(56) References Cited

U.S. PATENT DOCUMENTS 6,360,612 B1 * 3/2002 Trantzas .................. G01L 1/20
73/753
2009/0031825 A1 2/2009 Kishida et al.
(Continued)

FOREIGN PATENT DOCUMENTS

JP     S50-046178     5/1975
JP     2009-034742    2/2009
(Continued)

OTHER PUBLICATIONS

International Search Report and Written Opinion prepared by the Japan Patent Office on Jun. 29, 2021, for International Application No. PCT/JP2021/022097, 3 pgs.

*Primary Examiner* — Eric S. McCall
(74) *Attorney, Agent, or Firm* — Sheridan Ross PC

(57) ABSTRACT

A sensor apparatus and a robotic apparatus that can detect a distribution of a shearing force. A sensor apparatus according to an embodiment of the present technology includes a sensor section, a separation layer, and a first viscoelastic body layer. The sensor section includes a first pressure sensor on a front side of the sensor section that faces and a second pressure sensor on a rear side of the sensor section, the sensor section detecting a force applied in an in-plane direction. The separation layer is between the first pressure sensor and the second pressure sensor, and is made of a viscoelastic material that is deformed by a load applied to the first pressure sensor. The first viscoelastic body layer is on a front surface of the first pressure sensor, and is made of (Continued)

a viscoelastic material that is deformable on the first pressure sensor in the in-plane direction.

18 Claims, 33 Drawing Sheets

(56) References Cited

U.S. PATENT DOCUMENTS

| | | | |
|---|---|---|---|
| 2018/0073942 A1 | 3/2018 | Wu et al. | |
| 2023/0009475 A1* | 1/2023 | Sakakura | G01L 5/228 |
| 2025/0170723 A1* | 5/2025 | Kobayashi | B25J 13/081 |

FOREIGN PATENT DOCUMENTS

| | | |
|---|---|---|
| JP | 2015-169532 | 9/2015 |
| JP | 2020-046371 | 3/2020 |
| JP | 2020-046373 | 3/2020 |
| WO | WO 2018/051917 | 3/2018 |
| WO | WO-2020080127 A1 | 4/2020 |

* cited by examiner

PRESSURE SENSOR APPARATUS HAVING A VISCOELASTIC SEPARATION LAYER BETWEEN A FIRST PRESSURE SENSOR AND A SECOND PRESSURE SENSOR

CROSS REFERENCE TO RELATED APPLICATIONS

This application is a national stage application under 35 U.S.C. 371 and claims the benefit of PCT Application No. PCT/JP2021/022097, having an international filing date of 10 Jun. 2021, which designated the United States, which PCT application claimed the benefit of Japanese Patent Application No. 2020-190916, filed 17 Nov. 2020, the entire disclosures of each of which are incorporated herein by reference.

TECHNICAL FIELD

The present technology relates to a sensor apparatus and a robotic apparatus that detect a shearing force.

BACKGROUND ART

In recent years, automation of work using a robot has been discussed in various scenes as working population is reduced. There is a need to detect what kind of force is acting on the surface of a robot hand in order to control the behavior of the robot hand with a high degree of accuracy. Thus, a technology is known that detects, using a sensor provided to a robot hand, a shearing force or a slip that is caused on the palm of the hand when a target object is held with the robot hand.

For example, Patent Literature 1 discloses a sensor apparatus in which a viscoelastic body deformed by a load from the outside is situated between two pressure detectors. The sensor apparatus is configured to detect a shearing force applied to the viscoelastic body, using a difference between a pressure center position at which a pressure center is detected by one of the pressure detectors and a pressure center position at which a pressure center is detected by another of the pressure detectors.

CITATION LIST

Patent Literature

Patent Literature 1: Japanese Patent Application Laid-open No. 2009-34742

DISCLOSURE OF INVENTION

Technical Problem

For example, in order to control, to a high degree, the behavior of a robot hand that holds a target object, it is favorable that in which direction and in which portion of a holding surface of the robot hand a multiple-axis force acting on the robot hand is exerted be detected. However, when a plurality of elements each having a single detection axis is used in combination to detect a multiple-axis force, it will be difficult to avoid making the sensor apparatus larger in size. Further, in the sensor apparatus disclosed in Patent Literature 1, the viscoelastic body situated between the two pressure detectors is deformed due to being affected by a shearing force. This results in being unable to detect an in-plane distribution of a shearing force on the holding surface.

In view of the circumstances described above, it is an object of the present technology to provide a sensor apparatus and a robotic apparatus that can detect a distribution of a shearing force.

Solution to Problem

A sensor apparatus according to an embodiment of the present technology includes a sensor section, a separation layer, and a first viscoelastic body layer.

The sensor section includes a first pressure sensor situated on a front side of the sensor section, and a second pressure sensor situated on a rear side of the sensor section, the first pressure sensor and the second pressure sensor facing each other, the sensor section detecting a force applied in an in-plane direction, on the basis of a pressure detection position, in the in-plane direction, at which pressure is detected by the first pressure sensor, and on the basis of a pressure detection position, in the in-plane direction, at which pressure is detected by the second pressure sensor.

The separation layer is arranged between the first pressure sensor and the second pressure sensor, the separation layer being made of a viscoelastic material that is deformed by a load applied to the first pressure sensor.

The first viscoelastic body layer is arranged on a front surface of the first pressure sensor, the first viscoelastic body layer being made of a viscoelastic material that is deformable on the first pressure sensor in the in-plane direction.

The first viscoelastic body layer may have a thickness that is equal to or less than a thickness of the separation layer.

The first viscoelastic body layer may exhibit a degree of hardness that is equal to or lower than a degree of hardness that is exhibited by the separation layer.

A footprint of the first viscoelastic body layer with respect to the sensor section may be equal to or smaller than a footprint of the separation layer with respect to the sensor section.

Each of the first pressure sensor and the second pressure sensor may include a sensor electrode layer that includes a plurality of capacitive elements arranged in the in-plane direction, a reference electrode layer, and a deformation layer that is arranged between the sensor electrode layer and the reference electrode layer.

Capacitive elements of the plurality of capacitive elements in the first pressure sensor may be arranged in a matrix with first spacing on a surface of the sensor electrode layer in the first pressure sensor. In this case, capacitive elements of the plurality of capacitive elements in the second pressure sensor are arranged in a matrix with second spacing on a surface of the sensor electrode layer in the second pressure sensor, the second spacing being larger than the first spacing.

The first viscoelastic body layer may be made of a viscoelastic material that is more easily deformed in the in-plane direction than the deformation layer.

The sensor apparatus may further include a waterproof protection member that covers at least around the deformation layer.

The protection member may be configured to further cover around the separation layer and/or the first viscoelastic body layer.

The sensor apparatus may further include a second viscoelastic body layer. The second viscoelastic body layer is arranged on a back surface of the second pressure sensor, the second viscoelastic body layer being made of a viscoelastic material that is deformable on the second pressure sensor in the in-plane direction.

The second viscoelastic body layer may have a thickness that is equal to or less than a thickness of the first viscoelastic body layer.

At least one of the separation layer or the first viscoelastic body layer may include a plurality of pillar portions each being formed by gaps and extending in a direction vertical to the in-plane direction.

The gap may be provided in the form of a groove that does not pass through the separation layer or the first viscoelastic body layer in the direction vertical to the in-plane direction.

The gap may be provided in the form of a hole that passes through the separation layer or the first viscoelastic body layer in the direction vertical to the in-plane direction.

The sensor section may further include a computation element that calculates a distribution of a shearing force applied in the in-plane direction, on the basis of the pressure detection position, in the in-plane direction, at which pressure is detected by the first pressure sensor, and on the basis of the pressure detection position, in the in-plane direction, at which pressure is detected by the second pressure sensor.

The computation element may be configured to determine whether there is a shearing force on the basis of whether an amount of shift caused in the in-plane direction between a first pressure center position and a second pressure center position reaches a value that is equal to or greater than a specified value, the first pressure center position being a position at which a pressure center is detected by the first pressure sensor, the second pressure center position being a position at which a pressure center is detected by the second pressure sensor.

A robotic apparatus according to an embodiment of the present technology includes a sensor apparatus.

The sensor apparatus includes a sensor section, a separation layer, and a viscoelastic body layer.

The sensor section includes a first pressure sensor situated on a front side of the sensor section, and a second pressure sensor situated on a rear side of the sensor section, the first pressure sensor and the second pressure sensor facing each other, the sensor section detecting a force applied in an in-plane direction, on the basis of a pressure detection position, in the in-plane direction, at which pressure is detected by the first pressure sensor, and on the basis of a pressure detection position, in the in-plane direction, at which pressure is detected by the second pressure sensor.

The separation layer is arranged between the first pressure sensor and the second pressure sensor, the separation layer being made of a viscoelastic material that is deformed by a load applied to the first pressure sensor.

The viscoelastic body layer is arranged on a front surface of the first pressure sensor, the viscoelastic body layer being made of a viscoelastic material that is deformable on the first pressure sensor in the in-plane direction.

MODE(S) FOR CARRYING OUT THE INVENTION

Embodiments according to the present technology will now be described below with reference to the drawings.

First Embodiment

Figure 1:
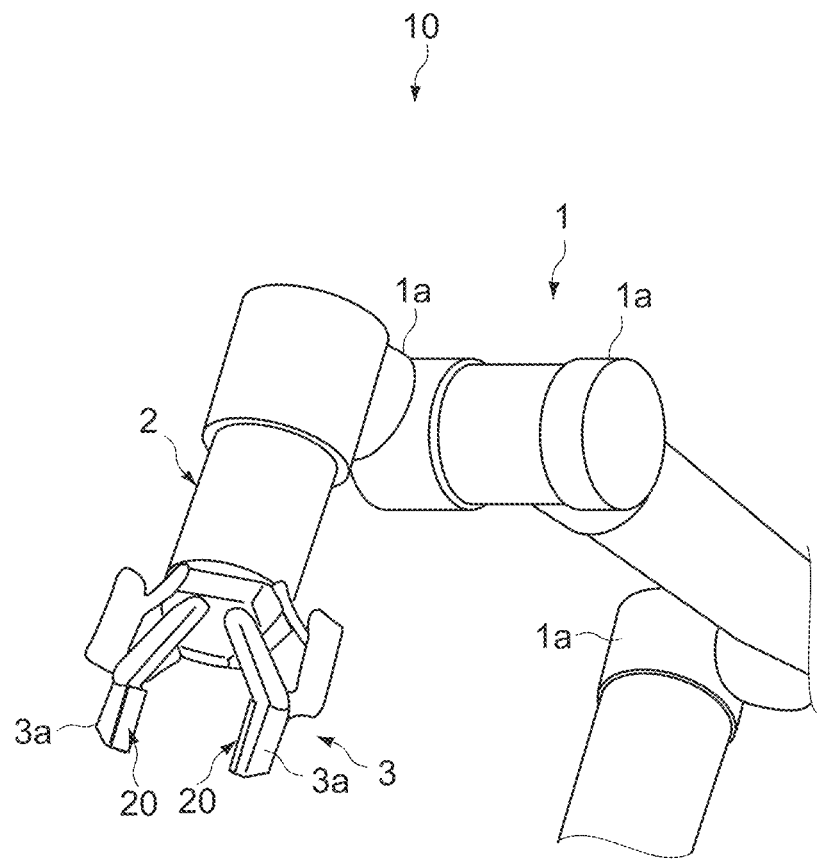
FIG. 1 is a perspective view of a primary portion of a robotic apparatus that includes a sensor apparatus according to a first embodiment of the present technology.

FIG. 1 is a perspective view of a primary portion of a robotic apparatus 10 that includes a sensor apparatus 20 according to a first embodiment of the present technology. As illustrated in FIG. 1, the robotic apparatus 10 includes an arm portion 1, a wrist portion 2, and a hand portion 3.

The arm portion 1 includes a plurality of joint portions 1a, and the hand portion 3 can be moved to any position by the joint portions 1a being driven. The wrist portion 2 is rotatably connected to the arm portion 1, and the hand portion 3 can be rotated by the rotation of the wrist portion 2.

The hand portion 3 includes two finger portions 3a that face each other, and a target object can be held between the two finger portions 3a by the two finger portions 3a being driven. Note that the hand portion 3 includes two fingers in the example illustrated in FIG. 1. However, the number of finger portions 3a can be changed as appropriate, such as three, or four or more.

Sensor apparatuses 20 are respectively provided to surfaces of the two finger portions 3a that face each other. The sensor apparatus 20 includes a pressure detection surface, and can detect a force applied to the pressure detection surface in the vertical direction (a Z-axis direction). Further, the sensor apparatus 20 can detect a force applied in an in-plane direction of the pressure detection surface (an X-axis direction and a Y-axis direction). In other words, the sensor apparatus 20 is a three-axis sensor that can detect forces corresponding to directions of three axes. Note that a configuration of the sensor apparatus 20 will be described later with reference to, for example, FIG. 2.

The robotic apparatus 10 is driven by control being performed by a control apparatus (not illustrated). The control apparatus may be a dedicated apparatus of the robotic apparatus 10 or a general-purpose apparatus. When the control apparatus is a general-purpose apparatus, the control apparatus may be, for example, a personal computer (PC), a cellular phone (including a smartphone), or a server apparatus in a network.

The control apparatus includes, for example, a controller and a storage. The controller is, for example, a central processing unit (CPU), and controls driving of each structural element of the robotic apparatus 10 on the basis of a program stored in the storage. Typically, the controller acquires information regarding forces in directions of three axes that are detected by the sensor apparatus 20, and controls driving of the hand portion 3 on the basis of the information regarding the forces, such that the hand portion 3 stably holds a target object with an appropriate holding force.

The storage includes a nonvolatile memory that stores therein various programs and data that are necessary for processing performed by the controller, and a volatile memory used as a working region for the controller. The various programs may be read from a portable recording medium such as a semiconductor memory, or may be downloaded from a server apparatus in a network.

Sensor Apparatus

Figure 2:
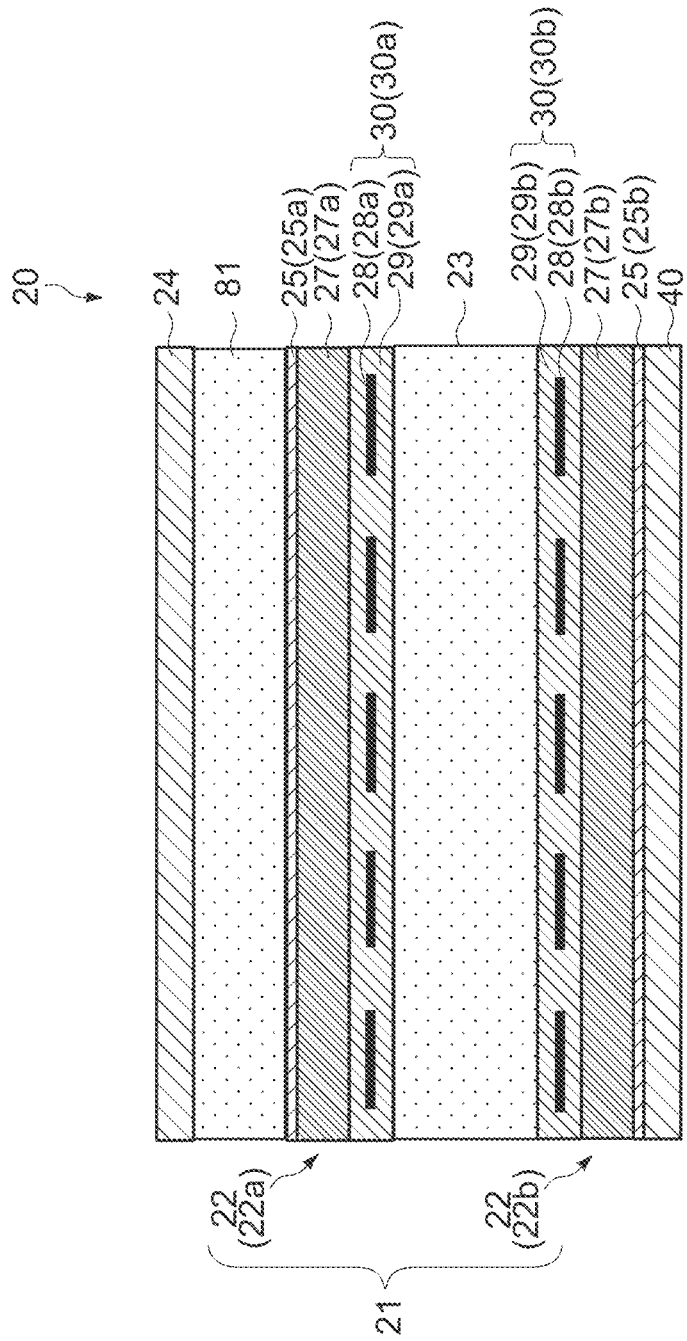
FIG. 2 is a cross-sectional side view of the sensor apparatus.
Figure 3:
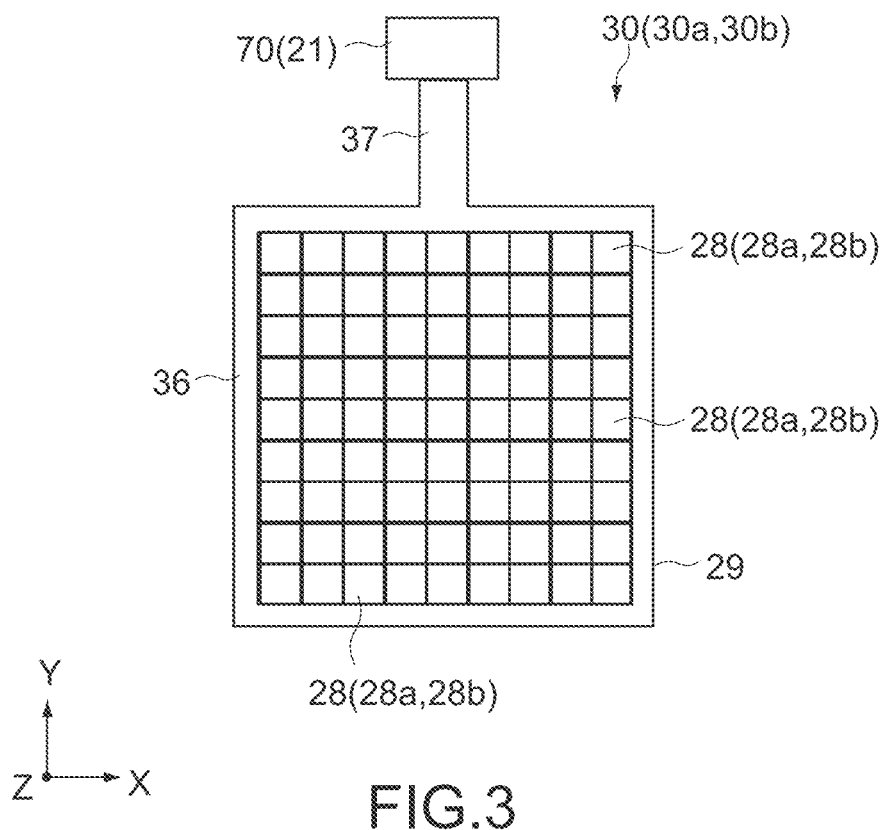
FIG. 3 is a plan view of an electrode layer of the sensor apparatus.

FIG. 2 is a cross-sectional view of the sensor apparatus 20 as viewed from a lateral side. FIG. 3 is a plan view of an electrode layer 30 of the sensor apparatus 20.

In each figure regarding the sensor apparatus 20, the X-axis direction and the Y-axis direction are directions parallel to a sensing surface (hereinafter also referred to as the in-plane direction) that is the pressure detection surface of the sensor apparatus 20, and the Z-axis direction is a direction vertical to the sensing surface (hereinafter also referred to as the vertical direction). Note that an upper portion in FIG. 2 corresponds to a front side on which an external force is applied, and a lower portion in FIG. 2 corresponds to a rear side that is situated opposite to the front side.

As illustrated in FIGS. 2 and 3, the entirety of the sensor apparatus 20 has a shape of a rectangular flat plate in a plan view. Note that, typically, it is sufficient if the shape of the sensor apparatus 20 in the plan view is set as appropriate according to a shape of a portion in which the sensor apparatus 20 is arranged, and the shape of the sensor apparatus 20 in the plan view is not particularly limited. For example, the shape of the sensor apparatus 20 in the plan view may be a polygon other than a rectangle, a circle, or an ellipse.

The sensor apparatus 20 includes a sensor section 21 that includes a first pressure sensor 22a situated on the front side and a second pressure sensor 22b situated on the rear side, and a separation layer 23 that is arranged between the first pressure sensor 22a and the second pressure sensor 22b. In other words, the sensor apparatus 20 has a structure in which the second pressure sensor 22b, the separation layer 23, and the first pressure sensor 22a are stacked vertically in this order from a lower-layer side. Note that, in the following description, the two pressure sensors 22a and 22b are each simply referred to as a "pressure sensor 22" when they are not particularly to be distinguished.

The sensor apparatus 20 further includes a viscoelastic body layer 81 (a first viscoelastic body layer) that is arranged on an upper side (a front-surface side) of the first pressure sensor 22a. As described later, the viscoelastic body layer 81 transmits an external force to the sensor section 21 while being deformed according to the external force.

The viscoelastic body layer 81 is covered with a surface layer 24. The surface layer 24 is made of any flexible material such as a plastic film, a woven fabric, a nonwoven fabric, rubber, or leather. The surface layer 24 is a contact surface that is brought into contact with a target object when the robotic apparatus 10 holds the target object with the finger portions 3a, and serves as the pressure detection surface subjected to a load (a reaction force of a holding force) applied by the target object during the holding operation. Thus, it is favorable that the surface layer 24 have surface characteristics that make it possible to obtain friction that is equal to or greater than specified friction between the surface layer 24 and a target object, in order to stably hold the target object.

Sensor Section

Subsequently, the sensor section 21 is described in detail.

The sensor section 21 detects a force (a shearing force Fs) applied to the sensor apparatus 20 in the in-plane direction, on the basis of a pressure center position, in the in-plane direction, at which a pressure center is detected (a pressure detection position, in the in-plane direction, at which pressure is detected) by the first pressure sensor 22a, and on the basis of a pressure center position, in the in-plane direction, at which a pressure center is detected (a pressure detection position, in the in-plane direction, at which pressure is detected) by the second pressure sensor 22b. Further, the sensor section 21 detects a force (a load Fz) applied to the sensor apparatus 20 vertically from an upper side on the basis of a value of pressure detected by the first pressure sensor 22a.

Note that the sensor section 21 may detect the force applied to the sensor apparatus 20 vertically from the upper side on the basis of two values that are a value of pressure detected by the first pressure sensor 22a and a value of pressure detected by the second pressure sensor 22b. In other words, typically, it is sufficient if the sensor section 21 is configured to detect the force applied vertically from the upper side on the basis of a value of pressure detected by at least the first pressure sensor 22a from between the first pressure sensor 22a and the second pressure sensor 22b.

The first pressure sensor 22a and the second pressure sensor 22b are arranged to vertically face each other. The first pressure sensor 22a has a structure in which a sensor electrode layer 30a, a deformation layer 27a, and a reference electrode layer 25a are stacked vertically in this order from a lower-layer side, where the sensor electrode layer 30a and the deformation layer 27a are stacked through a bonding layer (not illustrated), and the deformation layer 27a and the reference electrode layer 25a are stacked through the bonding layer.

Further, the second pressure sensor 22b has a structure in which a reference electrode layer 25b, a deformation layer 27b, and a sensor electrode layer 30b are stacked vertically in this order from a lower-layer side, where the reference electrode layer 25b and the deformation layer 27b are stacked through a bonding layer (not illustrated), and the deformation layer 27b and the sensor electrode layer 30b are stacked through the bonding layer.

Note that, as can be seen from the description herein, the first pressure sensor 22a and the second pressure sensor 22b are arranged such that a layer arrangement of the second pressure sensor 22b is the inverse of a layer arrangement of the first pressure sensor 22a in the vertical direction. Thus, the first pressure sensor 22a and the second pressure sensor 22b are configured such that their sensor electrode layers 30 are both arranged on a side of the separation layer 23. Note that, basically, the first pressure sensor 22a and the second pressure sensor 22b have similar configurations except that their layer arrangements are inverse in the vertical direction. Note that the first pressure sensor 22a and the second pressure sensor 22b may be arranged such that their layer arrangements are the same in the vertical direction.

Note that, in the following description, the two sensor electrode layers 30a and 30b are each simply referred to as a "sensor electrode layer 30" when they are not particularly to be distinguished, and the two deformation layers 27a and 27b are each simply referred to as a "deformation layer 27" when they are not particularly to be distinguished. Further, the two reference electrode layers 25a and 25b are each simply referred to as a "reference electrode layer 25" when they are not particularly to be distinguished.

The sensor electrode layer 30 includes, for example, a flexible printed circuit. As illustrated in FIG. 3, the sensor electrode layer 30 includes a body 36 that is rectangular in a plan view, and an extension 37 that extends outward from the body 36. Note that the shape of the sensor electrode layer 30 in the plan view is not limited to a rectangle, and can be changed as appropriate.

A computation element 70 that calculates a force in the in-plane direction on the basis of information regarding pressure detected by the pressure sensor 22 is mounted on the extension 37. The computation element 70 is typically a computer that includes a central processing unit (CPU), and includes an integrated circuit such as an IC chip. The computation element 70 is electrically connected to each of the first pressure sensor 22a and the second pressure sensor 22b, and the computation element 70 includes a memory that stores therein a program and various parameters that are used to perform a procedure of processing of calculating a distribution of a shearing force in the in-plane direction (described later) on the basis of a pressure detection position, in the in-plane direction, at which pressure is detected by each of the first pressure sensor 22a and the second pressure sensor 22b. The computation element 70 forms a portion of the sensor section 21 together with the pressure sensor 22.

The sensor electrode layer 30 includes a flexible base material 29 and a plurality of sensing sections 28 provided to a front surface of the base material 29 or in the base material 29.

For example, a polymer resin such as polyethylene terephthalate, polyimide, polycarbonate, or an acrylic resin is used as a material of the base material 29.

The sensing sections 28 are regularly arranged in a matrix with specified spacing in directions of length and width (length: the Y-axis direction, width: the X-axis direction). In the example illustrated in FIG. 3, the number of sensing sections 28 is 25 in total with five×five (length× width). Note that the number of sensing sections 28 can be changed as appropriate. Further, the numbers of sensing sections 28 in the sensor electrode layers 30a and 30b may be the same as each other, or different from each other.

Figure 4:
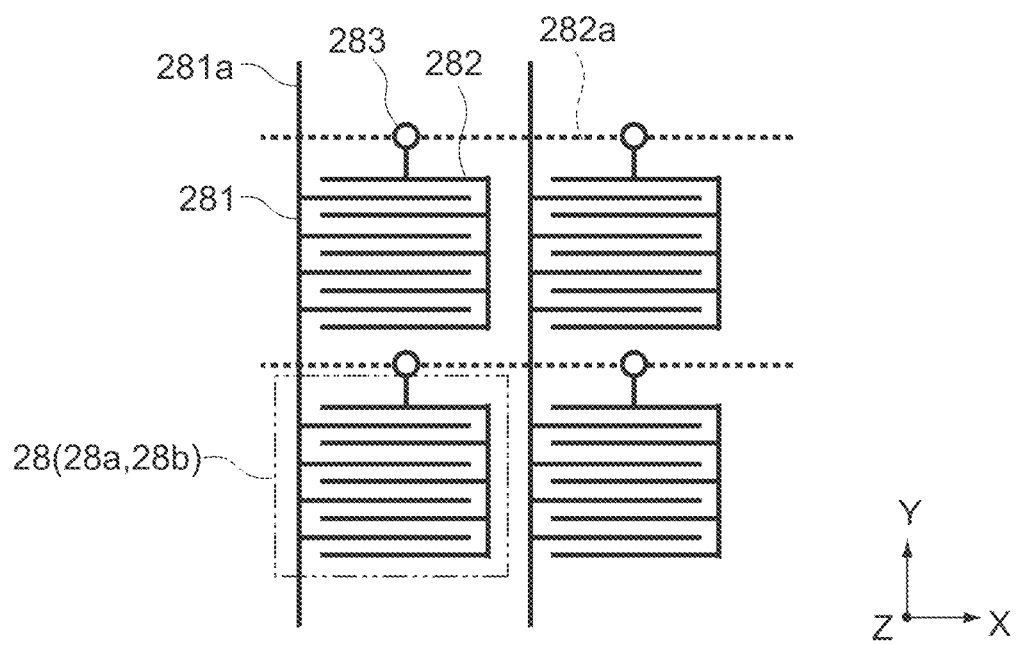
FIG. 4 is a plan view of a primary portion illustrating an example of a configuration of a sensing section of the sensor apparatus.

The sensing section 28 includes a capacitive element that can detect a change in a distance to the reference electrode layer 25 as a change in capacitance. As illustrated in, for example, FIG. 4, the sensing section 28 includes a pulse electrode 281 in the form of comb teeth and a sense electrode 282 in the form of comb teeth. The pulse electrode 281 in the form of comb teeth and the sense electrode 282 in the form of comb teeth are arranged such that the comb teeth of the pulse electrode 281 and the comb teeth of the sense electrode 282 face each other, and each sensing section 28 includes a region (a node area) in which the comb teeth of one of the pulse electrode 281 and the sense electrode 282 are each placed in a corresponding one of spaces each formed between the comb teeth of another of the pulse electrode 281 and the sense electrode 282. Each pulse electrode 281 is connected to wiring 281a that extends in the Y-axis direction, and each sense electrode 281 is connected to wiring 282a that extends in the X-axis direction. The wiring 281a is arranged on the front surface of the base material 29 in the X-axis direction, and the wiring 282a is arranged on a back surface of the base material 29 in the Y-axis direction. Each sense electrode 282 is electrically connected to the wiring 282a through a through-hole 283 provided to the base material 29. The sensor electrode layer 30 may include a ground line. The ground line is provided to, for example, an outer peripheral portion of the sensor electrode layer 30, or a portion in which the wiring 281a and the wiring 282a are placed side by side.

Note that the type of the sensing portion 28 is not particularly limited to the example described above, and any type may be adopted. For example, the sensor electrode layer 30 may be a multilayer body of a first electrode sheet that has a first electrode pattern in the form of a grid, and a second electrode sheet that has a second electrode pattern in the form of a grid, the first electrode pattern extending in the X-axis direction, the second electrode pattern extending in the Y-axis direction. In this case, the sensing section 28 is formed at an intersection of the first electrode pattern and the second electrode pattern.

The reference electrode layer is a so-called ground electrode, and is connected to a ground potential. The reference electrode layer 25 is flexible, and has a thickness of, for example, from about 0.05 µm to about 0.5 µm. For example, an inorganic conductive material, an organic conductive material, or a conductive material containing both the inorganic conductive material and the organic conductive material is used as a material of the reference electrode layer 25.

Examples of the inorganic conductive material include metals such as aluminum, copper, and silver; alloys such as stainless steel; and metal oxides such as zinc oxide and indium oxide. Further, examples of the organic conductive material include carbon materials such as carbon black and a carbon fiber, and conductive polymers such as substituted or unsubstituted polyaniline and polypyrrole. The reference electrode layer 25 may be made out of, for example, a thin plate made of metal such as stainless steel or aluminum; a conductive fiber; or a conductive nonwoven fabric. The reference electrode layer 25 is formed on a plastic film by, for example, vapor deposition, sputtering, bonding, or coating.

The reference electrode layer 25 included in the second pressure sensor 22b is attached to the surface of the finger portion 3a of the robotic apparatus 10 through a support 40. Typically, the support 40 is an adhesive layer such as a double-sided tape.

The deformation layer 27 is arranged between the sensor electrode layer 30 and the reference electrode layer 25. The deformation layer 27 has a thickness of, for example, from about 100 µm to about 1000 µm.

The deformation layer 27 is elastically deformable in response to an external force. When an external force is vertically applied to the sensor apparatus 20, the deformation layer 27 is elastically deformed in response to the external force, and the reference electrode layer 25 gets closer to the sensor electrode layer 30. Here, there is a change in capacitance between the pulse electrode 281 and the sense electrode 282 in the sensing section 28. This enables the sensing section 28 to detect this change in capacitance as a pressure value.

For example, the deformation layer 27 has a thickness greater than 100 µm, and equal to or less than 1000 µm. A basis weight of the deformation layer 27 is, for example, 50 mg/cm$^2$ or less. When the thickness and the basis weight of the deformation layer 27 are respectively set in these ranges, this makes it possible to improve a detection sensitivity of the pressure sensor 22 in the vertical direction.

A lower limit of the thickness of the deformation layer 27 is not particularly limited unless the lower limit is greater than 100 µm, and the lower limit may be, for example, 150 µm or greater, 200 µm or greater, 250 µm or greater, or 300 µm or greater.

Further, an upper limit of the thickness of the deformation layer 27 is not particularly limited unless the upper limit is equal to or less than 1000 µm, and the upper limit may be, for example, 950 µm or greater, 900 µm or less, 850 µm or less, or 800 or less.

The deformation layer 27 may include, for example, a patterning structure including a column structure. Various structures such as a matrix structure, a stripe structure, a mesh structure, a radial structure, a geometric structure, and a spiral structure may be adopted as the patterning structure.

Separation Layer

The separation layer 23 is fixed between the first pressure sensor 22a and the second pressure sensor 22b through bonding layers (not illustrated). The separation layer 23 is made of a viscoelastic material that is deformed by a load applied to the first pressure sensor 22a through the surface layer 24 and the viscoelastic body layer 81. Examples of this kind of viscoelastic material include a silicon gel, a urethane gel, synthetic rubber, and foam. A thickness of the separation layer 23 is not particularly limited, and is, for example, between 1000 μm and 5000 μm, inclusive. The thickness of the separation layer 23 is set according to, for example, a thickness of the viscoelastic body layer 81. A planar shape of the separation layer 23 is not particularly limited, and is typically a rectangle or a circle.

Viscoelastic Body Layer

The viscoelastic body layer 81 is arranged between the surface layer 24 and the first pressure sensor 22a (the surface of the first pressure sensor 22a) through bonding layers (not illustrated). The viscoelastic body layer 81 is made of a viscoelastic material that can be deformed on the first pressure sensor 22a in the in-plane direction. Examples of this kind of viscoelastic material include a silicon gel, a urethane gel, synthetic rubber, and foam. The thickness of the viscoelastic body layer 81 is not particularly limited, and is, for example, between 1000 μm and 5000 μm, inclusive. The thickness of the viscoelastic body layer 81 is set according to, for example, the thickness of the separation layer 23.

As described later, the viscoelastic body layer 81 is set to divide, in the in-plane direction, a multiple-axis force applied to the surface layer 24, and to detect a distribution of a shearing force (also referred to as a shearing distribution or multipoint shearing) on a surface of the surface layer 24. Thus, it is favorable that the viscoelastic body layer 81 be made of a viscoelastic material that is more easily deformed in the in-plane direction than the deformation layer 27a included in the first pressure sensor 22a. A principle of detection of a shearing force Fs that is performed by the sensor section 21 is described below.

Principle of Detection of Shearing Force Fs that is Performed by Sensor Section

Figure 5:
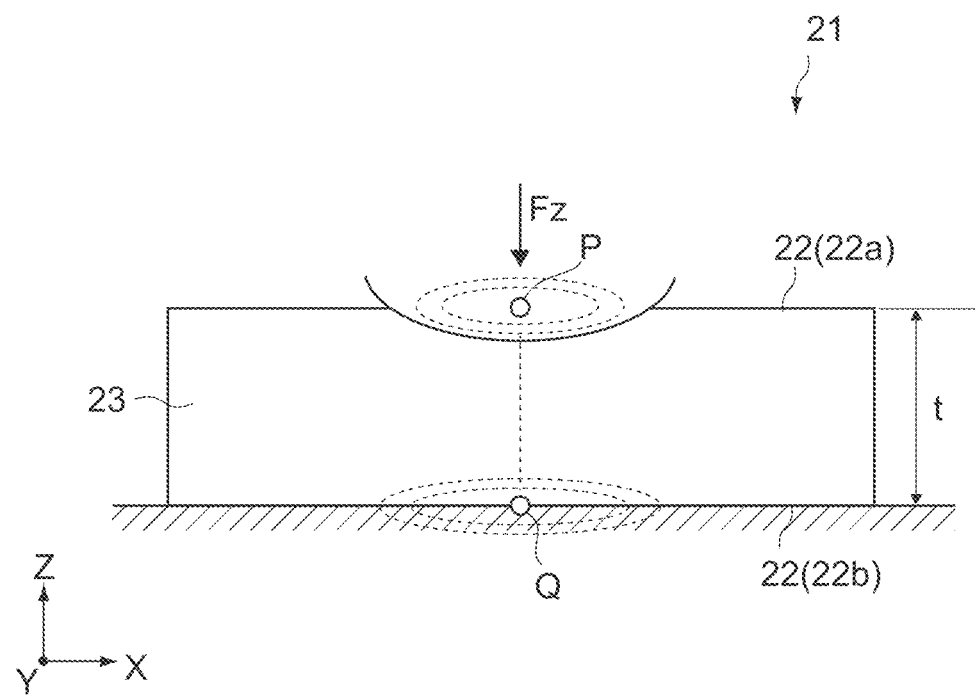
FIG. 5 is a diagram used to describe a state in which a load is vertically downwardly applied to the sensor section.
Figure 6:
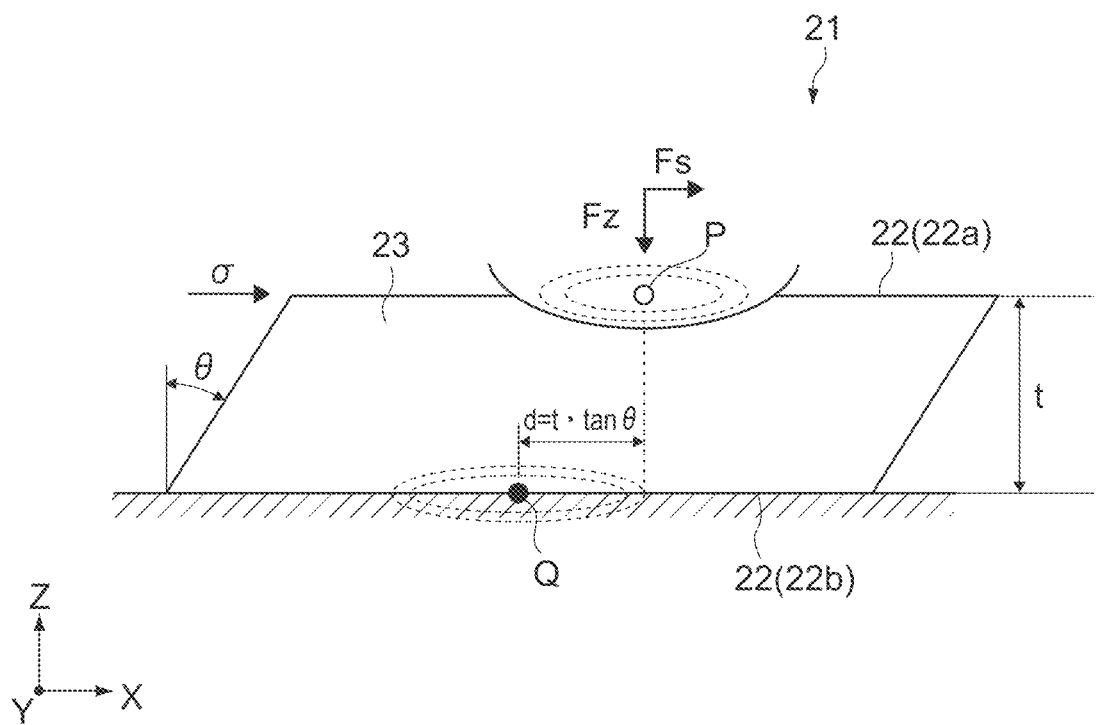
FIG. 6 is a diagram used to describe a state in which a shearing force is applied to the sensor section in an in-plane direction while a vertical load is being applied to the sensor section.

FIG. 5 illustrates, as a model, a state in which a load Fz is vertically downwardly applied to the sensor section 21. FIG. 6 illustrates, as a model, a state in which a shearing force Fs is applied to the sensor section 21 in the in-plane direction while a vertical load Fz is being applied to the sensor section 21. Note that, in FIGS. 5 and 6, a contour of detected pressure is indicated by dashed circles.

When a load Fz is vertically downwardly applied to the sensor section 21, a pressure center position P, in the in-plane direction, at which a pressure center is detected by the first pressure sensor 22a and a pressure center position Q, in the in-plane direction, at which a pressure center is detected by the second pressure sensor 22b coincide, as illustrated in FIG. 5. Note that the pressure center position refers to a position, in the in-plane direction, that corresponds to the highest pressure in a distribution of detected pressures.

On the other hand, when a shearing force Fs is applied to the sensor section 21 in the in-plane direction while a vertical load Fz is being applied to the sensor section 21, the pressure center position P, in the in-plane direction, at which a pressure center is detected by the first pressure sensor 22a and the pressure center position Q, in the in-plane direction, at which a pressure center is detected by the second pressure sensor 22b do not coincide, as illustrated in FIG. 6.

The separation layer 23 is distorted in response to the shearing force Fs applied in the in-plane direction. Here, the separation layer 23 causes a shearing stress a that corresponds to the shearing force Fs. Here, it is assumed that a shear modulus of the separation layer 23 is G, and the thickness of the separation layer 23 is t. It is further assumed that a difference between the pressure center position P at which a pressure center is detected by the first pressure sensor 22a and the pressure center position Q at which a pressure center is detected by the second pressure sensor 22b (hereinafter also referred to as an amount of coordinate movement) is d (=t×tan θ). In this case, the shearing stress σ (the shearing force Fs) is represented by Formula (1) indicated below.

$$\sigma = Fs = G \times d \quad (1)$$

Here, the shear modulus G of the separation layer 23 is known on the right side of Formula. Thus, when the amount d of coordinate movement that is a difference between the pressure center position P, in the in-plane direction, at which a pressure center is detected by the first pressure sensor 22a and the pressure center position Q, in the in-plane direction, at which a pressure center is detected by the second pressure sensor 22b is obtained on the basis of the pressure center position P and the pressure center position Q, the shearing stress Fs, that is, a force in the in-plane direction can be detected.

Figure 7:
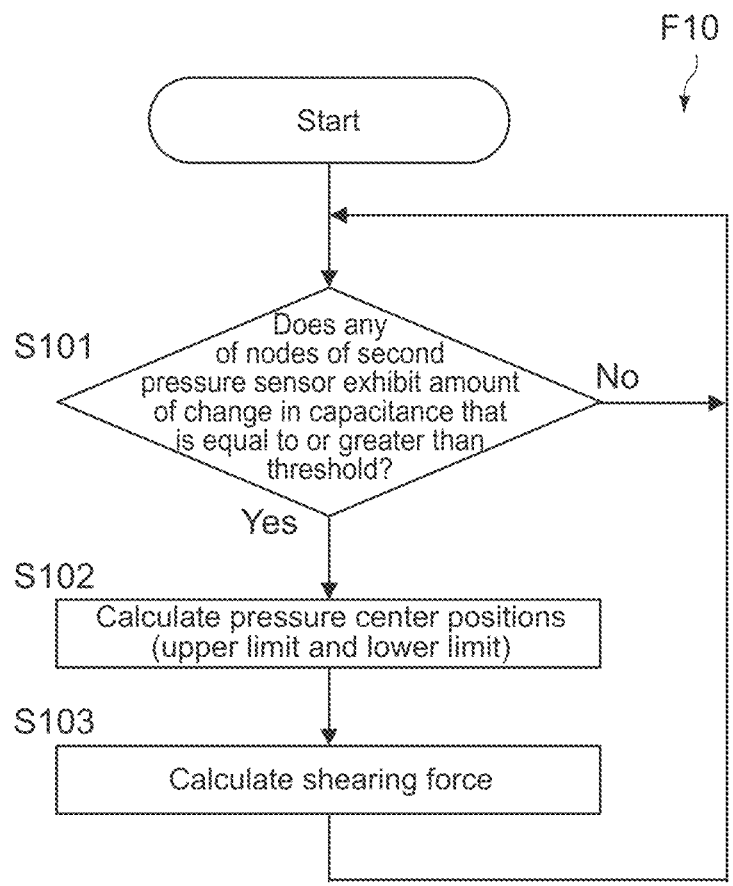
FIG. 7 is a flowchart used to describe a procedure of processing of calculating a shearing force.

FIG. 7 is a flowchart used to describe a procedure (F10) of processing of calculating a shearing force. This processing can be performed by, for example, the computation element 70.

When a load is applied to the sensor section 21, it is determined whether there exists a sensing section 28, from among a plurality of sensing sections 28 (nodes) of the second pressure sensor 22b, that exhibits an amount of change in capacitance that is equal to or greater than a threshold. When there exists at least one sensing section 28 that exhibits an amount of change in capacitance that is equal to or greater than the threshold (Yes in Step 101), an upper limit of a pressure center position (for example, the position P) and a lower limit of the pressure center position (for example, the position Q) are calculated on the basis of output from the first pressure sensor 22a and output from the second pressure sensor 22b (Step 102). Then, a shearing force is calculated using Formula (1) indicated above on the basis of an amount of coordinate movement that is obtained from these pressure center positions (Step 103).

Action on Sensor Apparatus

A force that acts on the sensing surface of the sensor apparatus 20 is not limited to a load Fz alone or a shearing force Fs alone. The load Fz and the shearing force Fs may act at the same time. However, when the load Fz and the shearing force Fs are detected only using the sensor section 21, the load Fz and the shearing force will not be separated from each other. This results in being difficult to detect a distribution of a shearing force in the in-plane direction.

Figure 8:
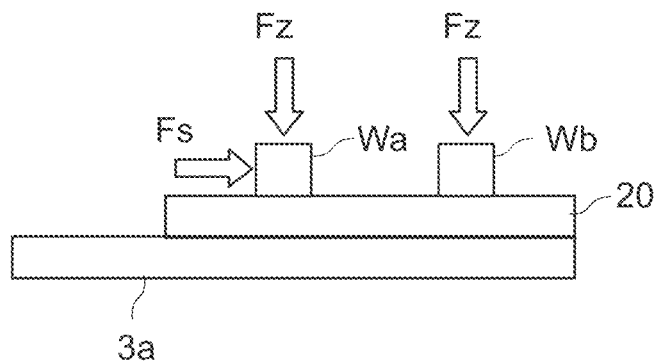
FIG. 8 is a schematic side view used to describe an action on the sensor section.

The case in which two pushers Wa and Wb act on the sensor apparatus 20 at the same time, as illustrated in FIG. 8, is discussed as an example. The load Fz is applied to each pusher Wa to be vertically applied to the sensor section 21, and, in any direction (a direction of the pusher Wb in the illustrated example), the shearing force Fs is applied to only one of the pushers that is the pusher Wa. In response to the shearing force Fs being applied to the pusher Wa, the separation layer 23 is deformed in the in-plane direction.

Figure 9:
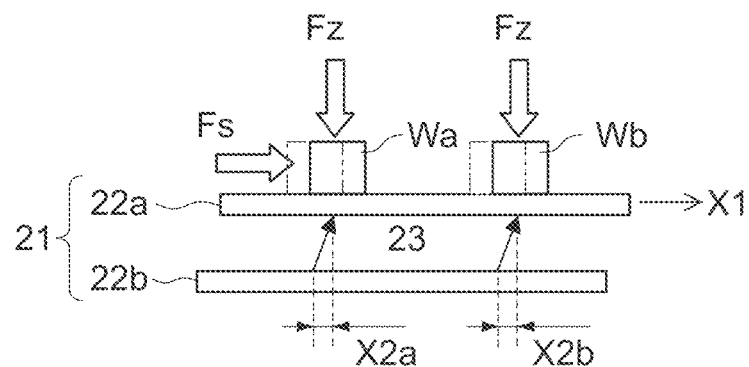
FIG. 9 is a schematic side view used to describe an action on a sensor apparatus that does not include a first viscoelastic body layer.

Here, the case in which the pushers Wa and Wb directly act on the sensor section 21 without the viscoelastic body layer 81 is discussed. In response to the shearing force Fs acting on the pusher Wa, the first pressure sensor 22a situated on the front side is easily moved integrally with the separation layer 23, as illustrated in FIG. 9. In other words, the first pressure sensor 22a is moved with respect to the second pressure sensor 22b in the in-plane direction by a specified amount (X1 in the illustrated example) in response to the separation layer 23 being deformed.

Consequently, an amount X2a of coordinate movement (that corresponds to d described above) in a shearing region (that is situated just under the pusher Wa), and an amount X2b of coordinate movement (that corresponds to d described above) in a non-shearing region (that is situated just under the pusher Wb) are equal to each other. In other words, despite the fact that only the vertical load Fs acts on the pusher Wb, an action of the shearing force Fs on the pusher Wb is erroneously detected (refer to Step 103 in FIG. 7). As described above, it is difficult to divide the pressing forces respectively applied by the pushers Wa and Wb only using the sensor section 21. This results in being very difficult to detect a distribution of a shearing force in the in-plane direction.

Figure 10:
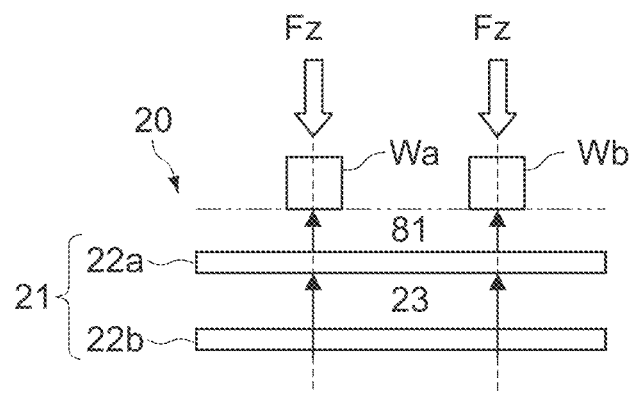
FIG. 10 is a schematic side view used to describe an action on a sensor apparatus that includes the first viscoelastic body layer.
Figure 11:
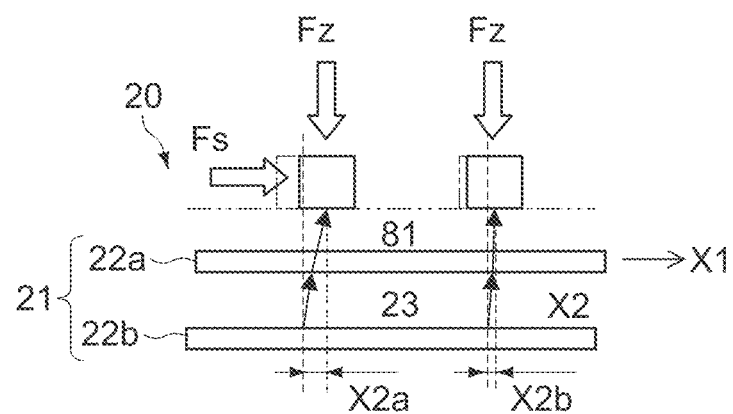
FIG. 11 is a schematic side view used to describe an action on the sensor apparatus including the first viscoelastic body layer.

On the other hand, the sensor apparatus 20 of the present embodiment includes the viscoelastic body layer 81 above the first pressure sensor 22a. Thus, the movement of the first pressure sensor 22a due to the shearing force Fs acting on the pusher Wa can be made smaller. FIGS. 10 and 11 schematically illustrate a relationship between the sensor apparatus 20 and the pushers Wa and Wb, where FIG. 10 illustrates a state before the shearing force Fs is applied to the pusher Wa, and FIG. 11 illustrates a state after the shearing force Fs is applied to the pusher Wa.

As illustrated in FIG. 10, the pushers Wa and Wb face the first pressure sensor 22a through the viscoelastic body layer 81. When the shearing force Fs is applied to the pusher Wa in this state, as illustrated in FIG. 11, the viscoelastic body layer 81 and the separation layer 23 are respectively deformed in the in-plane direction. Here, the first pressure sensor 22a is deformed by an amount corresponding to an amount of deformation of the viscoelastic body layer 81. The first pressure sensor 22a is locally deformed, and a deformation of a region of the viscoelastic body layer 81 that is situated just under the pusher Wb is suppressed. Further, the first pressure sensor 22a is deformed as the viscoelastic body layer 81 is deformed. Thus, the amount X1 of movement of the first pressure sensor 22a in the in-plane direction is smaller, compared to when there is no viscoelastic body layer 81 (FIG. 8).

Consequently, the deformation of the separation layer 23 in the in-plane direction is also large in a detection region for the pusher Wa, and is also small in a detection region for the pusher Wb. Thus, the amount X2b of coordinate movement in the non-shearing region is made smaller than the amount X2a of coordinate movement in the shearing region. This results in being able to separate pressing forces respectively applied by the pushers Wa and Wb. Consequently, an in-plane distribution of a shearing force acting on the sensor section 21 can be detected.

Figure 12:
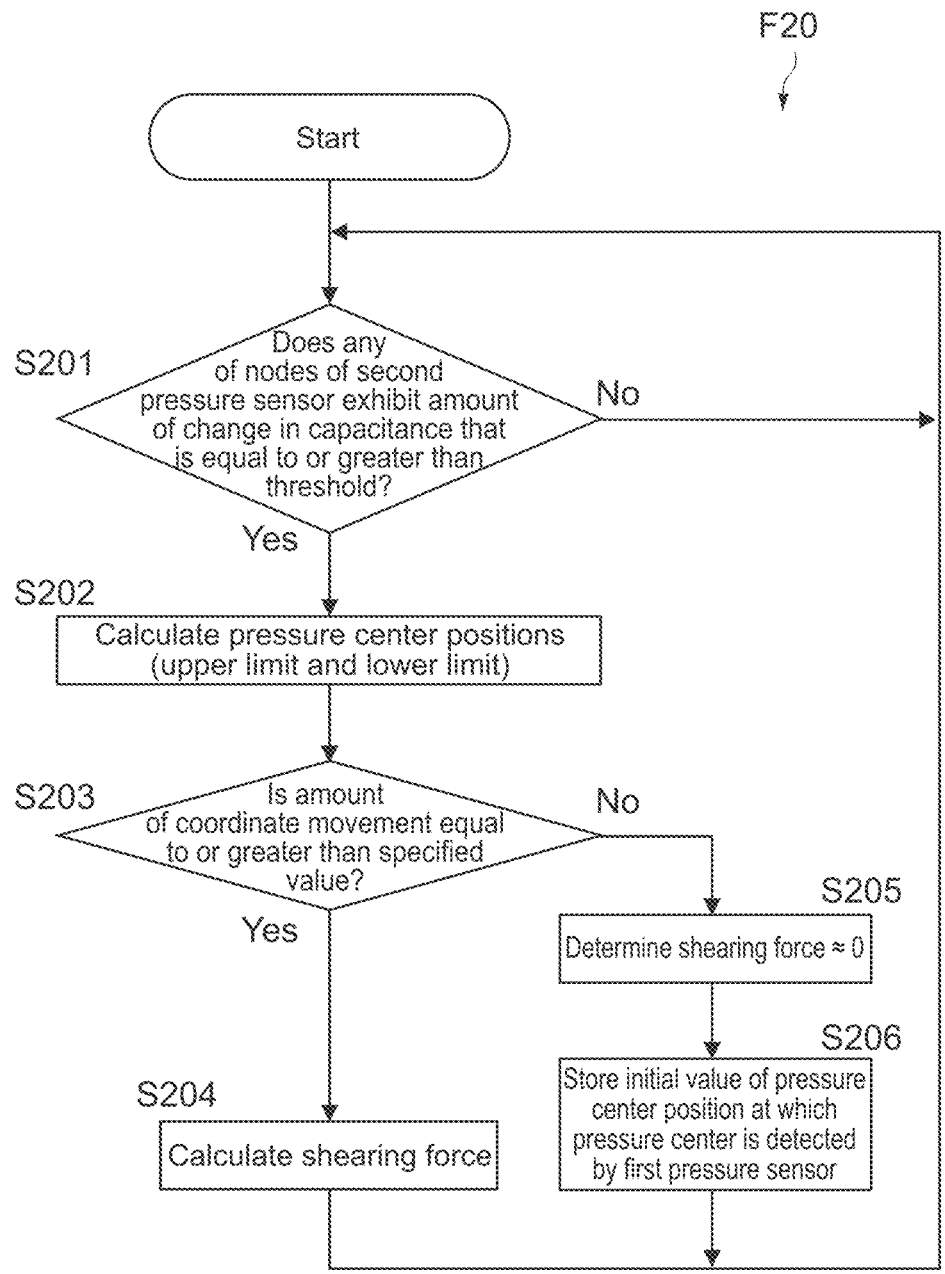
FIG. 12 is a flowchart used to describe an example of a procedure of processing performed by a computation element of the sensor apparatus.

FIG. 12 is a flowchart used to describe an example of a procedure (F20) of processing performed by the computation element 70 of the sensor apparatus 20 of the present embodiment.

When a load is applied to the sensor apparatus 20, the computation element 70 determines whether there exists a sensing section 28, from among a plurality of sensing sections 28 (nodes) of the second pressure sensor 22b situated on the lower-layer side, that exhibits an amount of change in capacitance that is equal to or greater than a threshold. When there exists at least one sensing section 28 that exhibits an amount of change in capacitance that is equal to or greater than the threshold (Yes in Step 201), the computation element 70 calculates an upper limit of a pressure center position (for example, the position P) and a lower limit of the pressure center position (for example, the position Q) on the basis of output from the first pressure sensor 22a and output from the second pressure sensor 22b (Step 202). The processes so far are similar to the processing procedure described with reference to FIG. 7.

Subsequently, the computation element 70 determines whether an amount of movement of coordinates of a pressing force is equal to or greater than a specified value (Step 203). As described above, the amount of coordinate movement corresponds to the difference d between the pressure center position P at which a pressure center is detected by the first pressure sensor 22a and the pressure center position Q at which a pressure center is detected by the second pressure sensor 22b. When the amount of coordinate movement is equal to or greater than the specified value (Yes in Step 203), the computation element 70 determines that a significant shearing force (or slip) is caused on the sensing surface, and calculates the shearing force using Formula (1) described above (Step 204).

On the other hand, when the amount of coordinate movement is less than the specified value (No in Step 203), the computation element 70 determines that the significant shearing force is not caused on the sensing surface (Step 205). In this case, the computation element 70 stores therein an initial value of the pressure center position P at which a pressure center is detected by the first pressure sensor 22a situated on an upper-layer side (Step 206). A temporal change in a pressing force applied to the sensor apparatus 2 is detected by the procedure described above being repeatedly performed with a specified period.

The specified value in Step 203 can be set discretionarily according to, for example, thicknesses of or areas of the separation layer 23 and the viscoelastic body layer 81, a value of physical properties such as a degree of viscoelasticity, ease of deformation of the first pressure sensor 22a, or an arrangement pitch of the sensing section 28 in each of the pressure sensors 22a and 22b. It is favorable that the specified value be set to, for example, a value with which a shearing force could be determined to not be virtually caused at a detection point for the pusher Wb due to a shearing force applied by the pusher Wa.

The computation element 70 outputs a calculation value of a shearing force calculated in Step 204 or an initial value of the pressure center position P stored in Step 206 to the controller of the robotic apparatus 10. Driving of the arm portion 1, the wrist portion 2, and the hand portion 3 of the robotic apparatus 10 is controlled.

According to the present embodiment, the presence of shearing is detected on the basis of an amount of deformation of the separation layer 23, and a shearing sensitivity in each pressing portion is detected on the basis of an amount of deformation of the viscoelastic body 81. This results in being able to detect a distribution of a shearing force on the sensing surface. As described above, it can be individually determined whether a significant shearing force acts on each pressing point by adding a process of determining the presence of shearing (Step 203). This makes it possible to appropriately determine whether a force that is acting on the pressing point is a shearing force or a vertical load, and thus to detect a distribution of a shearing force with a higher degree of accuracy.

An amount-of-deformation ratio (mutual interference) of respective pressing points on each of the separation layer 23 and the viscoelastic body layer 81 may be referred to as an indicator used to evaluate a distribution of a shearing force. It is assumed that a diameter of a contact surface of each of the pushers Wa and Wb is 6 mm, a distance between centers of the pushers Wa and Wb is 12 mm, a magnitude of a vertical load Fz is 5 N, and an amount of movement of the pusher Wa is 3 mm in, for example, FIG. 11. Results of measuring an amount X1 of coordinate movement of the first pressure sensor 22a on the upper-layer side with respect to each pressing point, and a difference X2 in pressure center position between the first and second pressure sensors 22a and 22b with respect to each pressing point, are given in Table 1.

Here, an example of calculating magnitudes of X1 and X2 using the processing procedure (F20) illustrated in FIG. 12 is given in Table 1. Note that the results given in Table 1 are merely examples, and they differ depending on, for example, a thickness of or physical properties of each of the separation layer 23 and the viscoelastic body layer 81, or a node pitch (an arrangement pitch of the sensing section 28) in each pressure sensor.

TABLE 1

|  |  |  | Wb | Mutual interference |
|---|---|---|---|---|
| Amount of movement (mm) | X1 | 2.28 | 0.11 | 5% |
|  | X2 | 0.78 | 0.48 | 62% |

The amount X1 of coordinate movement corresponds to an amount of in-plane deformation of the viscoelastic body layer 81, and the difference X2 corresponds to an amount of in-plane deformation of the separation layer 23. Here, a ratio of Wb/Wa is calculated as a mutual interference for each of X1 and X2, and as a result, about 5% is obtained for X1, and about 62% is obtained for X2. In other words, the result shows that the mutual interference of pressing forces between the respective pressing points (Wa and Wb) is relaxed due to the presence of the viscoelastic body layer 81, and the relaxation effect results in also relaxing the mutual interference of pressing forces between the respective pressing points in the separation layer 23.

A higher detection resolution with respect to a distribution of a shearing force is obtained if the mutual interference of X2 exhibits a smaller value. For example, the mutual interference of X2 is favorably 65% or less, more favorably 50% or less, and most favorably 10% or less. Thus, when thicknesses of or areas of the separation layer 23 and the viscoelastic body layer 81, or physical properties are selected using the mutual interference as an evaluation indicator, this makes it possible to set the resolution with respect to the distribution of a shearing force to a desired value. Further, the specified value in Step 203 of the processing procedure F20 (FIG. 12) can be set using the mutual interference as a control indicator.

Relationship Between Separation Layer and Viscoelastic Body Layer and Others

The thickness of the viscoelastic body layer 81 is not particularly limited. Favorably, the viscoelastic body layer 81 has a thickness equal to or less than the thickness of the separation layer 23, and more favorably, the viscoelastic body layer 81 is thinner than the separation layer 23. If the viscoelastic body layer 81 is thicker than the separation layer 23, the mutual interference between the respective pressing points in the separation layer 23 will tend to be more relaxed, but it will be difficult to secure a desired minimum load sensitivity of the sensor apparatus 20. For example, when the separation layer 23 has a thickness of 4 mm, the viscoelastic body layer 81 has a thickness of 4 mm or less, and more favorably 2 mm or less.

A degree of hardness of the viscoelastic body layer 81 is also not particularly limited. Favorably, the degree of hardness of the viscoelastic body layer 81 is equal to or lower than the degree of hardness of the separation layer 23, and more favorably, the degree of hardness of the viscoelastic body layer 81 is lower than the degree of hardness of the separation layer 23. If the degree of hardness of the viscoelastic body layer 81 is too high, the sensitivity to a vertical load will be increased, but the mutual interference between the respective pressing points will tend to be also increased. For example, the degree of hardness refers to 60° or greater when penetration (JIS K2207) is used as an indicator, and refers to 10° or less for the Shore A.

A footprint of the viscoelastic body layer 81 (the area on the sensor section 21 as viewed from a direction vertical to the sensing surface, and the same applies in the following description) is also not particularly limited. Favorably, the footprint of the viscoelastic body layer 81 is equal to or smaller than a footprint of the separation layer 23, and more favorably, the footprint of the viscoelastic body layer 81 is smaller than the footprint of the separation layer 23. When the footprint of the viscoelastic body layer 81 is made smaller than the footprint of the separation layer 23, this makes it possible to make the minimum load sensitivity of the sensor apparatus 20 smaller.

Figure 13:
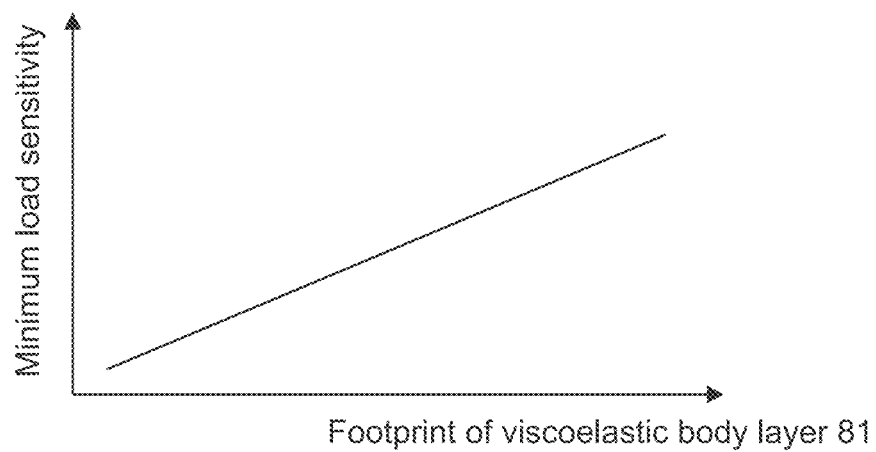
FIG. 13 illustrates a relationship between a footprint of the first viscoelastic body layer and the minimum load sensitivity.

FIG. 13 schematically illustrates a relationship between the footprint of the viscoelastic body layer 81 and the minimum load sensitivity. The footprint of the viscoelastic body layer 81 and the minimum load sensitivity have a substantially linear relationship. Thus, when a holding-target object is relatively light in weight, it is favorable that the footprint of the viscoelastic body layer 81 be small.

Figure 14:
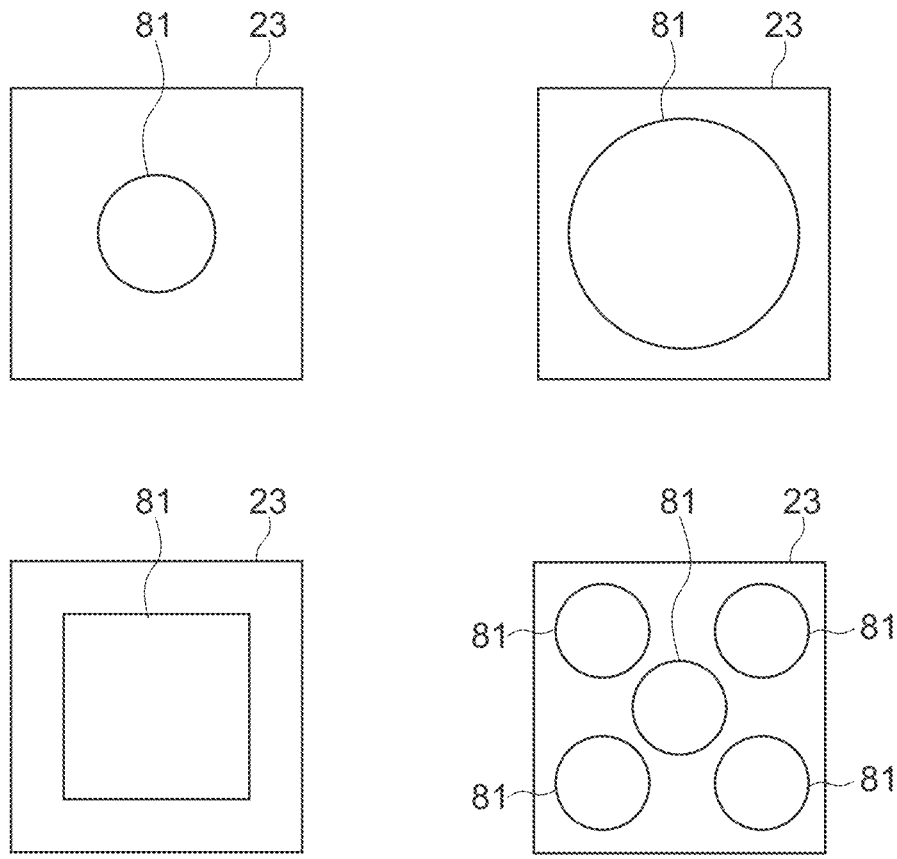
FIG. 14 schematically illustrates an example of a layout of arrangement of the first viscoelastic body layer with respect to a separation layer of the sensor apparatus.

A planar shape of the viscoelastic body layer 81 is not limited to a rectangle, and the viscoelastic body layer 81 may have any shape such as a circle, a trapezoid, a triangle, or a parallelogram. Further, the viscoelastic body layer 81 may be formed by being divided into a plurality of regions. FIG. 14 schematically illustrates an example of a layout of arrangement of the viscoelastic body layer 81 with respect to the separation layer 23.

Figure 15:
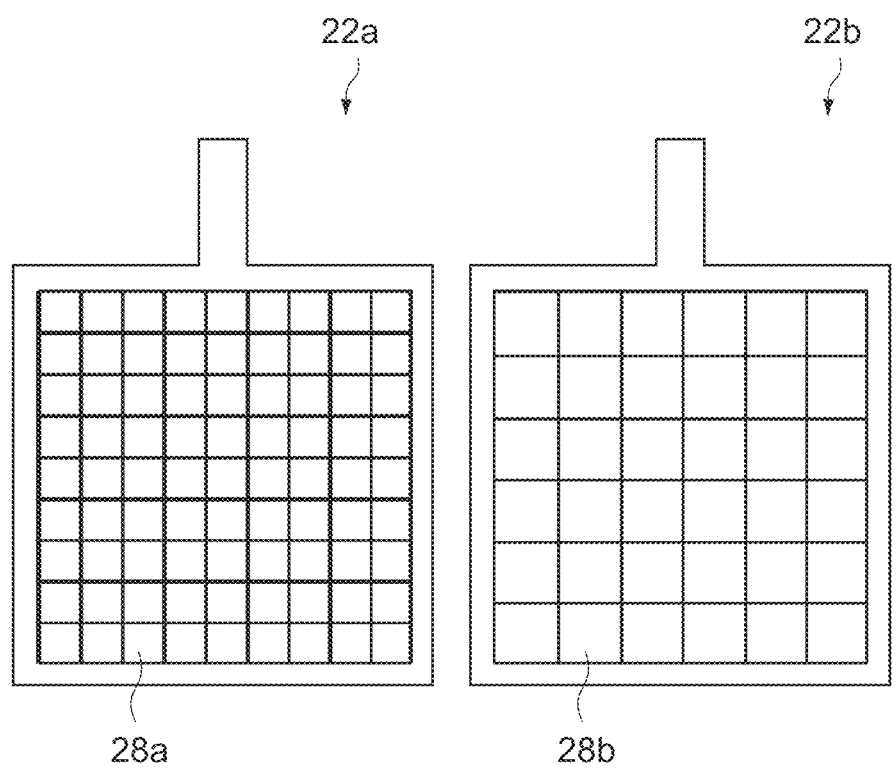
FIG. 15 schematically illustrates an example of a relationship between a sensing section of a first pressure sensor and a sensing section of a second pressure sensor in the sensor apparatus.

Further, the respective sensing sections 28 (28a and 28b) in the first pressure sensor 22a and the second pressure sensor 22b may be arranged such that arrangement spacing of the sensing sections 28a and arrangement spacing of the sensing sections 28b are different from each other. In general, the detection resolution with respect to a pressure distribution can be made higher by making arrangement spacing of the sensing sections 28 smaller. Furthermore, when arrangement spacing (first spacing) of the sensing sections 28a of the first pressure sensor 22a is made smaller than arrangement spacing (second spacing) of the sensing sections 28b of the second pressure sensor 22b, as illustrated in FIG. 15, this makes it possible to improve the sensitivity in detecting a shearing force. Moreover, the first pressure sensor 22a and the second pressure sensor 22b may also have different initial capacities of the sensing sections 28 (capacitances of the sensing sections 28 before a load is detected).

In the example of FIG. 15, nine sensing sections 28a in length and nine sensing sections 28a in width are arranged with respect to one of the sensing sections 28, and six sensing sections 28b in length and six sensing sections 28b in width are arranged with respect to another of the sensing sections 28. Without being limited thereto, twelve sensing sections 28a in length and twelve sensing sections 28a in width may be arranged with respect to one of the sensing sections 28, and eight sensing sections 28b in length and eight sensing sections 28b in width may be arranged with respect to another of the sensing sections 28. Arrangement spacing (the number) of the sensing sections 28a, and arrangement spacing (the number) of the sensing sections 28b can be set discretionarily according to, for example, the sensor size or a desired nose size.

Second Embodiment

Figure 16:
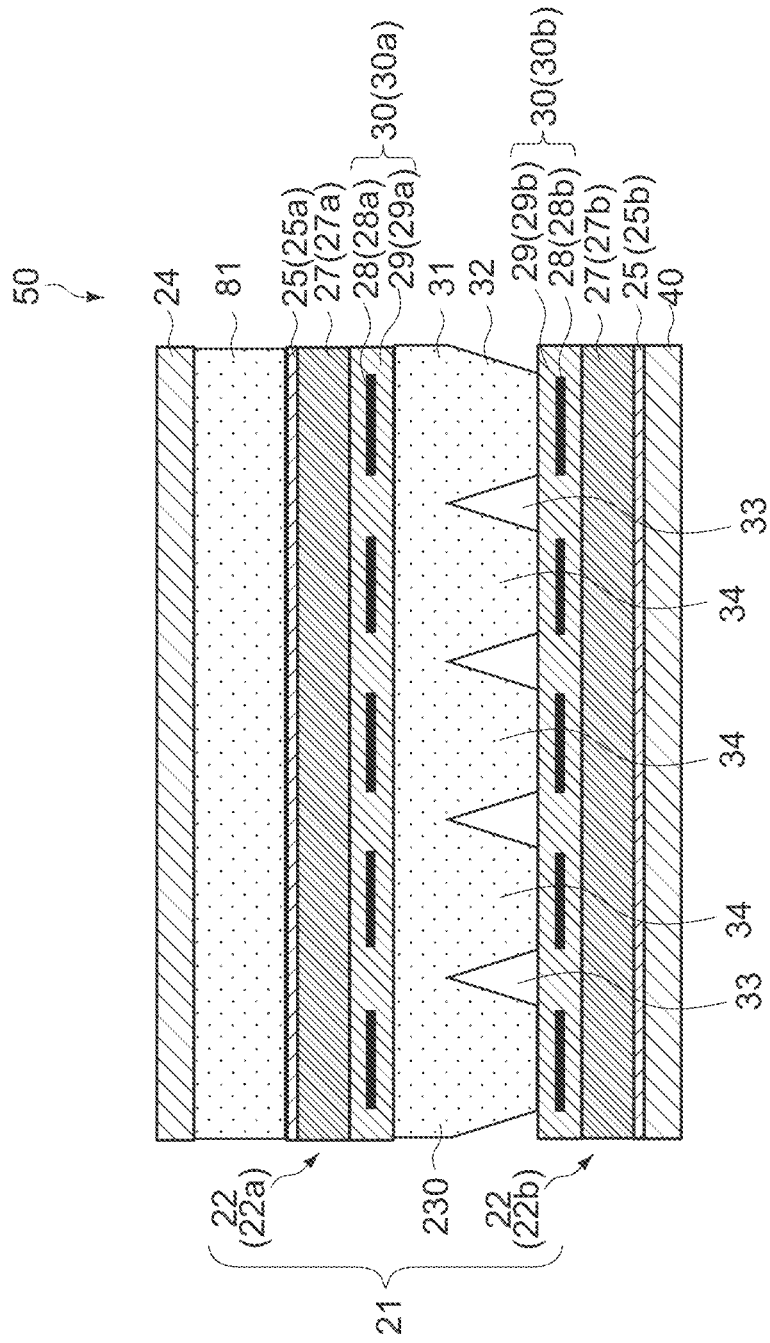
FIG. 16 is a cross-sectional side view illustrating a configuration of a sensor apparatus according to a second embodiment of the present technology.

FIG. 16 is a cross-sectional side view illustrating a configuration of a sensor apparatus 50 according to a second embodiment of the present technology. In the following description, a structural element that is different from the structural elements of the first embodiment is primarily described. A structural element that is similar to the structural element of the first embodiment is denoted by a reference numeral similar to the reference numeral used in the first embodiment, and a description thereof is omitted or simplified.

Figure 17:
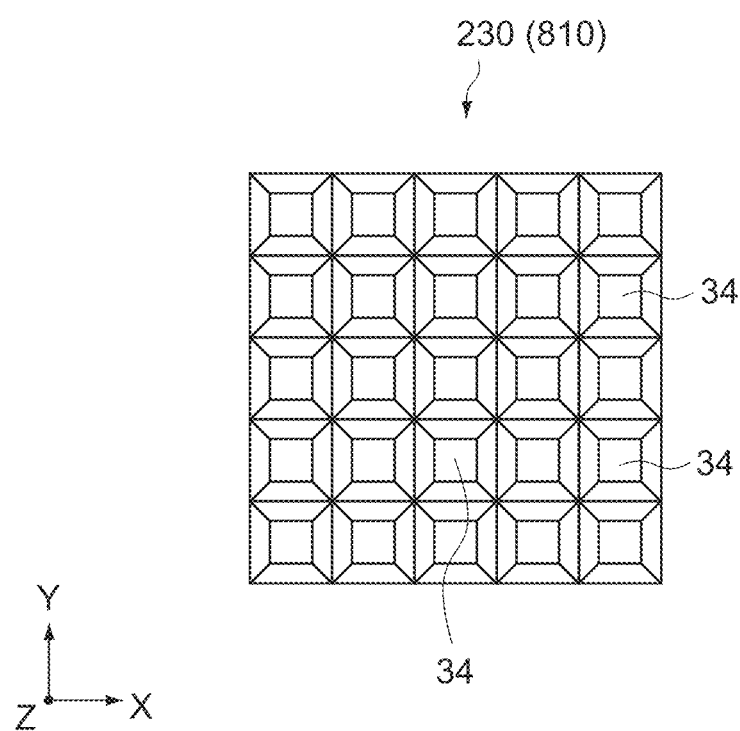
FIG. 17 illustrates a separation layer of the sensor apparatus as viewed from the rear side.

The sensor apparatus 50 of the present embodiment includes a separation layer 230 that has a configuration different from the configuration of the separation layer of the first embodiment. FIG. 17 illustrates the separation layer 230 of the sensor apparatus 50 as viewed from the rear side. The separation layer 230 is hereinafter primarily described in detail.

The separation layer 230 includes a gap 33, and a plurality of pillar portions 34 each being formed by the gaps 33 and extending vertically. The gap 33 is provided in the form of a groove on a side of a back surface of the separation layer 230 (on a side of the second pressure sensor 22b), where the groove does not vertically pass through the separation layer 230.

On a side of a front surface of the separation layer 230 (on a side of the first pressure sensor 22a), the separation layer 230 includes an infilling layer 31 (a first layer) that has an infilling structure that does not include the gap 33. Further, on the side of the back surface of the separation layer 230 (on the side of the second pressure sensor 22b), the separation layer 23 includes a pillar layer 32 (a second layer) that includes the gap 33, and the plurality of pillar portions 34 each formed by the gaps 33.

Each of the plurality of pillar portions 34 has a shape that is not constant in thickness in the vertical direction, that is, a shape having a thickness that varies in the vertical direction. In the example illustrated in FIGS. 16 and 17, each of the plurality of pillar portions 34 is formed to get thinner gradually in the vertical direction from the front side (on the side of the first pressure sensor 22a) to the rear side (on the side of the second pressure sensor 22b). Specifically, each of the plurality of pillar portions 34 has a shape of an inverted frustum of a quadrangular pyramid. Note that the pillar portion 34 may be formed into a shape of, for example, an inverted frustum of a cone, an inverted frustum of a triangular pyramid, an inverted frustum of a pentagonal pyramid, or an inverted frustum of a hexagonal pyramid.

The pillar portions 34 are regularly arranged lengthwise and widthwise. The pillar portions 34 are respectively provided to positions that correspond to the respective sensing sections 28 in the vertical direction. Thus, the gaps 33 used to form the pillar portions 34 are each provided to a position that does not correspond to the sensing section 28 in the vertical direction. The number of pillar portions 34 is the same as the number of sensing sections 28b of the second pressure sensor 22b, that is, 25 in total with five× five (length× width). Note that the number of pillar portions 34 can be changed as appropriate.

The separation layer 230 has a thickness of, for example, between about 1000 μm and about 5000 μm. A height of the pillar portion 34 in the vertical direction (that is, a depth of the gap 33 in the form of a groove) is, for example, equal to or greater than 20%, equal to or greater than 25%, equal to or greater than 30%, equal to or greater than 35%, equal to or greater than 40%, or equal to or greater than 45% of the thickness of the separation layer 23. Note that it is not a problem if the pillar portion 34 has a large height (for example, 100% of the thickness of the separation layer 230). However, there is a possibility that the pillar portion 34 will not work effectively if the height of the pillar portion 34 is too small (for example, a height less than 20% of the thickness of the separation layer 230).

The area (in the in-plane direction) of a lower surface of the pillar portion 34 (a portion of the pillar portion 34 that is brought into contact with the second pressure sensor 22b) is set according to the area of the sensing section 28b of the second pressure sensor 22b, and is, for example, the area equal to the area of the sensing section 28b.

Typically, the separation layer 230 is made of a viscoelastic material that has viscoelastic characteristics. Examples of a material used for the separation layer 230 include a silicon gel, a urethane gel, synthetic rubber, and foam.

Figure 18:
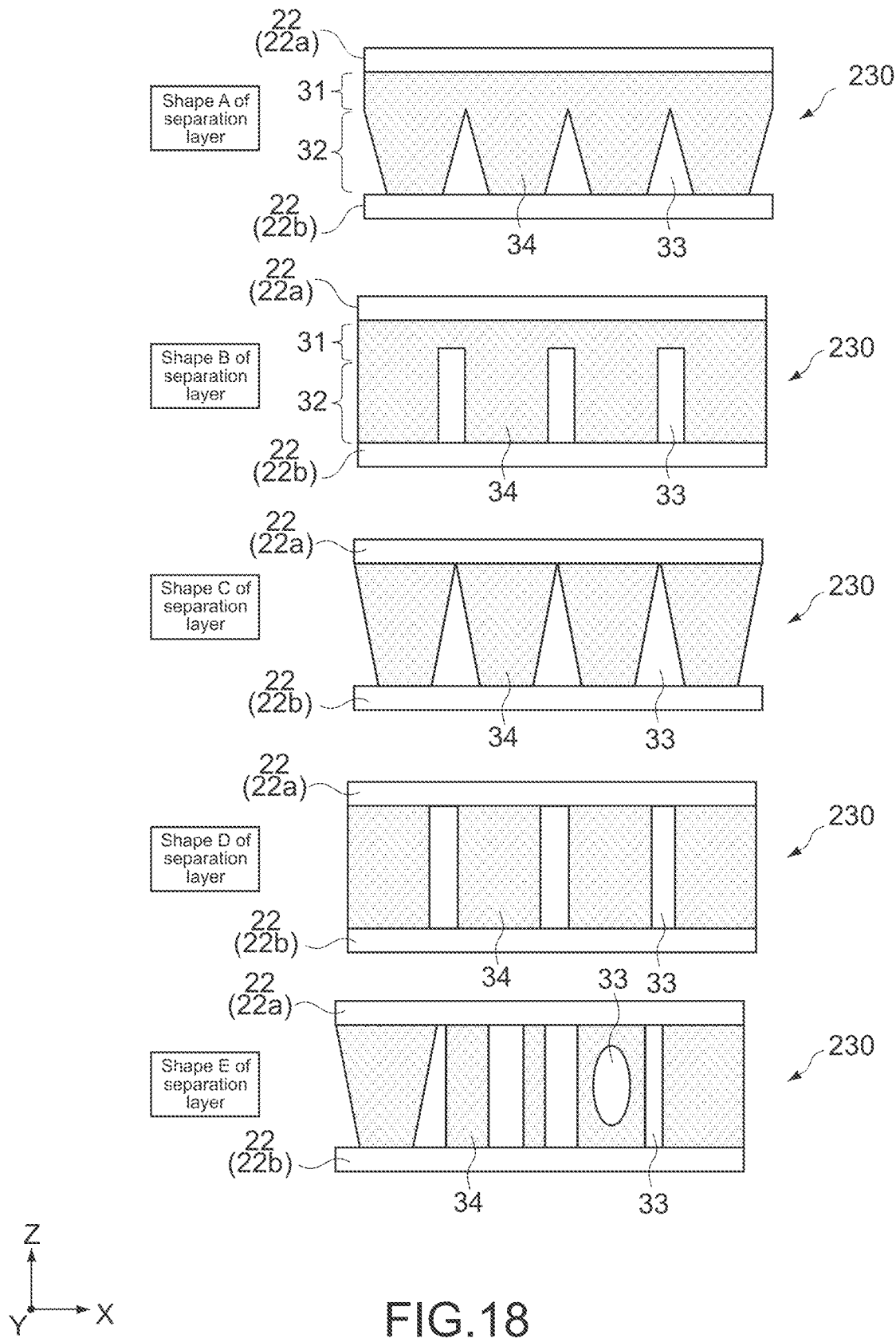
FIG. 18 illustrates examples of the shape of the separation layer of the sensor apparatus.

Next, respective examples of the shape of the separation layer 230 are described. FIG. 18 illustrates the respective examples of the shape of the separation layer 230. FIG. 18 illustrates five patterns of the shapes of the separation layer 230 that are shapes A to E. Note that FIG. 18 simply illustrates the first pressure sensor 22a and the second pressure sensor 22b.

Shape A

The shape A is a shape already described in FIGS. 16 and 17.

Shape B

As in the case of the shape A, the gap 33 in the case of a shape B is provided in the form of a groove on a side of a back surface of the separation layer 230 (on the side of the second pressure sensor 22b), where the groove does not vertically pass through the separation layer 230. Further, as in the case of the shape A, a two-layer structure that includes the infilling layer 31 and the pillar layer 32 is provided in the case of the shape B.

The pillar portion 34 in the case of the shape A has a shape having a thickness that varies in the vertical direction, whereas the pillar portion 34 in the case of the shape B has the same thickness in the vertical direction. Specifically, the pillar portion 34 in the case of the shape B has a shape of a quadrangular prism. Note that the pillar portion 34 in this case may have a shape of, for example, a cylinder, a triangular prism, a pentagonal prism, or a hexagonal prism.

Note that, as in the case of the pillar portion 34 in the case of the shape A, the pillar portion 34 in the case of the shape B is typically provided to a position that corresponds to the sensing section 28b of the second pressure sensor 22b in the vertical direction. Note that the same applies to the shapes C to E.

Shape C

In the case of the shapes A and B, the gap 33 is in the form of a groove that does not vertically pass through the separation layer 23. In the case of the shape C, the gap 33 is in the form of a hole that vertically passes through the separation layer 23. For this reason, the pillar portion 34 in the case of the shape C has a height larger than the pillar portion 34 in the case of the shapes A and B. In the case of the shape C, the height of the pillar portion 34 has the same length as the thickness of the separation layer 23. In other words, the height of the pillar portion 34 has a length of 100% of the thickness of the separation layer 230.

Further, in the case of the shapes A and B, the separation layer 230 has a two-layer structure that includes the infilling layer 31 and the pillar layer 32. In the case of the shape C, the separation layer 230 has a single-layer structure that includes the pillar layer 32 without the infilling layer 31. In the case of the shape C, the pillar portion 34 has a shape of an inverted frustum of a quadrangular pyramid. However, the pillar portion 34 may have a shape of, for example, an inverted frustum of a cone, an inverted frustum of a triangular pyramid, an inverted frustum of a pentagonal pyramid, or an inverted frustum of a hexagonal pyramid.

Shape D

As in the case of the shape C, the gap 33 in the case of the shape D is in the form of a hole that vertically passes through the separation layer 23. Further, as in the case of the shape C, a height of the pillar portion 34 has the same length as the thickness of the separation layer 23 in the case of the shape D. In other words, the height of the pillar portion 34 has a length of 100% of the thickness of the separation layer 23.

The pillar portion 34 in the case of the shape C has a shape having a thickness that varies in the vertical direction, whereas the pillar portion 34 in the case of the shape D has the same thickness in the vertical direction. Specifically, the pillar portion 34 in the case of the shape D has a shape of a quadrangular prism. Note that the pillar portion 34 in this case may have a shape of, for example, a cylinder, a triangular prism, a pentagonal prism, or a hexagonal prism.

Shape E

The shape E is an example of a combination of, for example, the shapes A to D. In other words, the shapes A to D and the like can be combined as appropriate. In the case of the shape E, a leftmost pillar portion 34 corresponds to the pillar portion 34 in the case of the shape C. Four pillar portions 34 other than the leftmost pillar portion 34 each correspond to the pillar portion 34 in the case of the shape D, and have different thicknesses. Note that the second pillar portion 34 from the right includes a circular gap 33 (the gap 33 out of contact with the first pressure sensor 22a and the second pressure sensor 22b) in the middle in the vertical direction.

Figure 19:
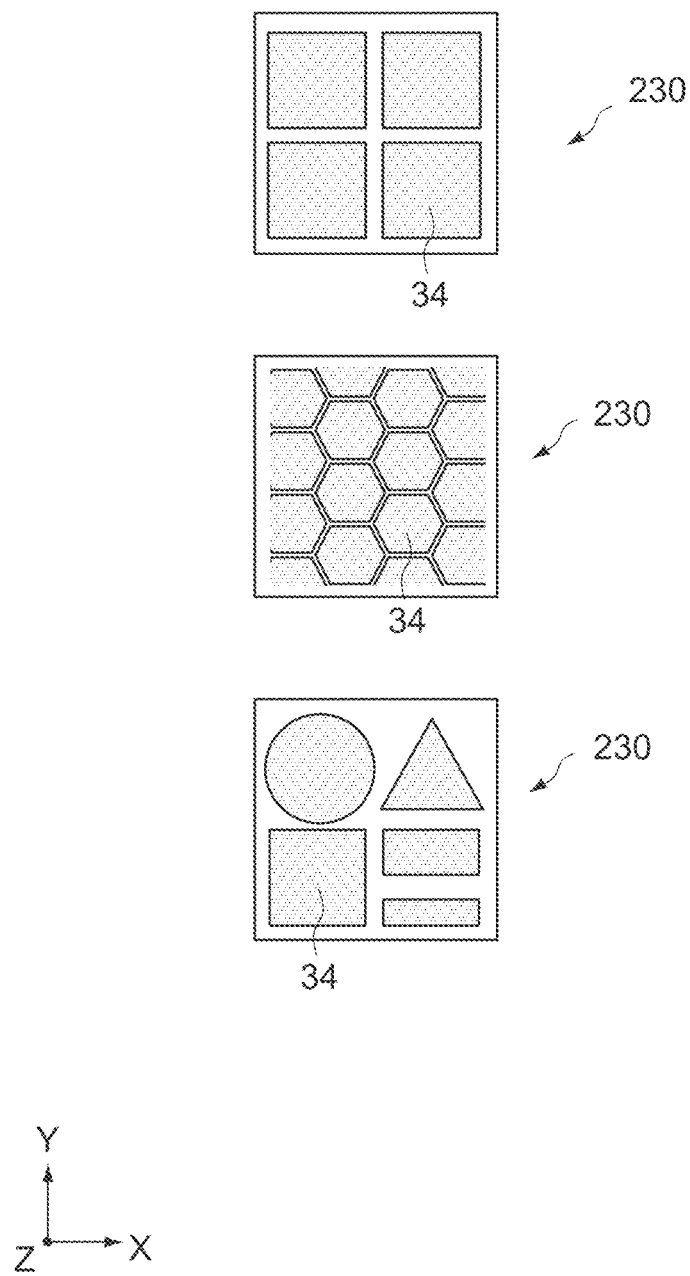
FIG. 19 illustrates the separation layers of the sensor apparatus as viewed from a side of a back surface of the separation layer, and illustrates patterns of shapes of pillar portions in the plan view.

FIG. 19 illustrates the separation layers 230 as viewed from the side of the back surface, and illustrates patterns of shapes of the pillar portions 34 in the plan view.

An uppermost diagram in FIG. 19 illustrates the pillar portions 34 each having a shape of a quadrilateral prism. Further, a second diagram from the top in FIG. 19 illustrates the pillar portions 34 each having a hexagonal prism (s honeycomb structure). Furthermore, a lowermost diagram in FIG. 19 illustrates the pillar portions 34 having different shapes (for example, a cylinder, a quadrilateral prism, and a triangular prism) in combination.

The sensor apparatus 50 of the present embodiment having the configuration described above includes the separation layer 230 having the configuration described above. This makes it possible to improve the sensitivity in detecting a shearing force.

In other words, the separation layer 230 includes the gap 33 in the present embodiment. Thus, when the shearing force Fs is applied, the separation layer 230 is locally distorted in the in-plane direction in which the shearing force Fs is caused, and the distortion is less transmitted to a portion other than the locally distorted portion. The state of being easily locally distorted (the shearing stress a) is uniformly provided regardless of a point in the in-plane direction. Thus, in the present embodiment, the sensitivity in detecting the shearing force Fs is uniformly provided in the in-plane direction.

Further, the separation layer 230 includes the gap 33 in the present embodiment. Thus, the separation layer 230 is easily distorted (the shearing stress a is made smaller) at each point in the in-plane direction when the shearing force Fs is applied, and this results in improving the sensitivity in detecting the shearing force Fs.

Furthermore, in the present embodiment, the pillar portion 34 formed by the gaps 33 is provided to a portion, in the second pressure sensor 22b, that corresponds to the sensing section 28. Thus, when a vertical load Fz is applied to the sensor apparatus 20, the pillar portion 34 locally presses a portion, in the second pressure sensor 22b, that corresponds to the sensing section 28. This makes it possible to efficiently transmit the force in the second pressure sensor 22b. Thus, even if the vertical load Fz is light, the pressure center position Q can be precisely detected in the second pressure sensor 22b, and thus the shearing force Fs can be precisely measured.

Note that, when the shape of the separation layer 230 has a two-layer structure that includes the infilling layer 31 and the pillar layer 32, as in the case of the shape A or B, the pillar layer 32 may be made of a material that is relatively harder than the infilling layer 31. In this case, when the vertical load Fz is applied to the sensor apparatus 20, the pillar portion 34 of the relatively harder pillar layer 32 locally presses a portion, in the second pressure sensor 22b, that corresponds to the sensing section 28. This makes it possible to efficiently transmit the force in the second pressure sensor 22b.

Further, the above-described configuration of the separation layer 230 may also be similarly applied to the viscoelastic body layer 81, as described later. Also in this case, the viscoelastic body layer 81 is easily distorted in the in-plane direction at each point of the viscoelastic body layer 81 when the shearing force Fs is applied. This makes it possible to improve the sensitivity in detecting the shearing force Fs. The above-described configuration of the separation layer 230 can be applied to at least one of the separation layer 23 or the viscoelastic body layer 81 in FIG. 2.

Third Embodiment

Figure 20:
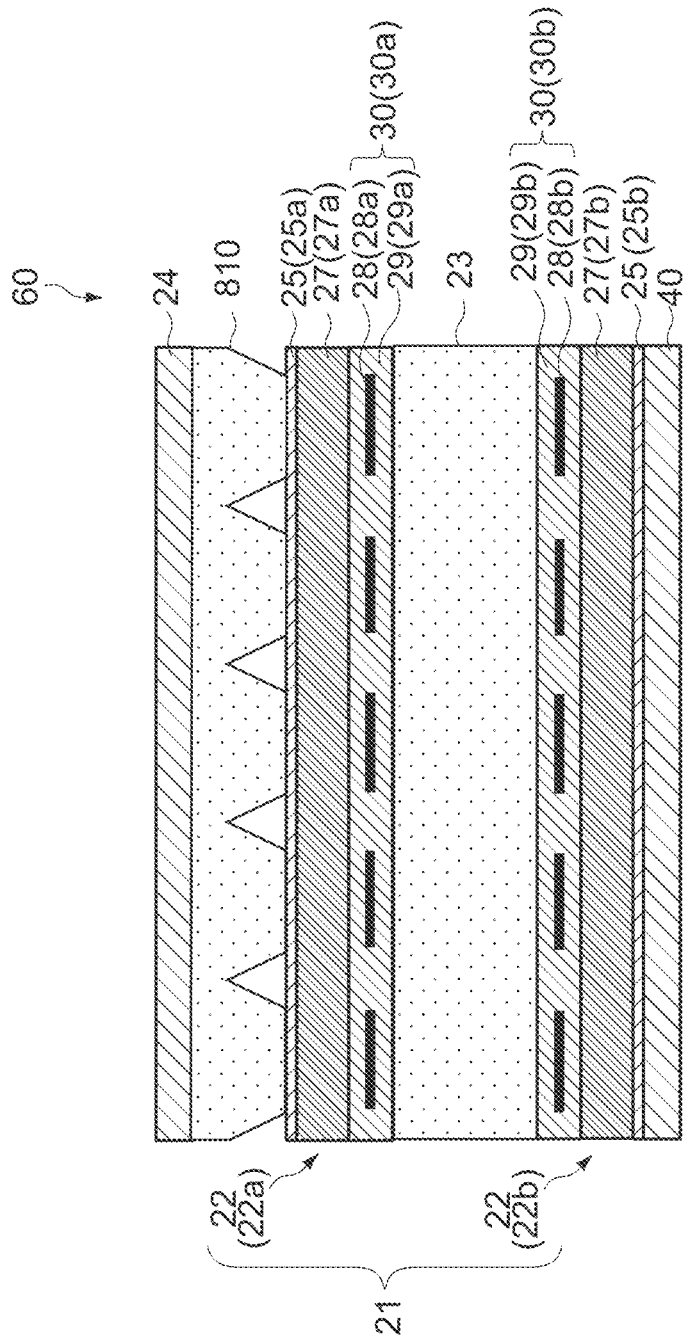
FIG. 20 is a cross-sectional side view illustrating a configuration of a sensor apparatus according to a third embodiment of the present technology.

FIG. 20 is a cross-sectional side view illustrating a configuration of a sensor apparatus 60 according to a third embodiment of the present technology. In the following description, a structural element that is different from the structural elements of the first embodiment is primarily described. A structural element that is similar to the structural element of the first embodiment is denoted by a reference numeral similar to the reference numeral used in the first embodiment, and a description thereof is omitted or simplified.

The sensor apparatus 60 of the present embodiment includes a viscoelastic body layer 810 that has a configuration different from the configuration of the viscoelastic body layer of the first embodiment. The viscoelastic body layer 810 is formed similarly to the separation layer 230 described in the second embodiment, and a back surface of the viscoelastic body layer 810 is formed into a concave-convex shape, as illustrated in FIG. 17.

In other words, the viscoelastic body layer 810 includes the gap 33, and a plurality of pillar portions 34 each being formed by the gaps 33 and extending vertically. The gap 33 is provided in the form of a groove on a side of the back surface of the viscoelastic body layer 810 (on a side of the second pressure sensor 22b), where the groove does not vertically pass through the viscoelastic body layer 810. Each of the plurality of pillar portions 34 has a shape that is not constant in thickness in the vertical direction, that is, a shape having a thickness that varies in the vertical direction. In the example illustrated in FIG. 20, each of the plurality of pillar portions 34 is formed to get thinner gradually in the vertical direction from a front side (on a side of the surface layer 24) to a rear side (on a side of the first pressure sensor 22a). Specifically, each of the plurality of pillar portions 34 has a shape of an inverted frustum of a quadrangular pyramid. Note that the pillar portion 34 may be formed into a shape of, for example, an inverted frustum of a cone, an inverted frustum of a triangular pyramid, an inverted frustum of a pentagonal pyramid, or an inverted frustum of a hexagonal pyramid.

The pillar portions 34 are regularly arranged lengthwise and widthwise. The pillar portions 34 are respectively provided to positions that correspond to the respective sensing sections 28 in the vertical direction. Thus, the gaps 33 used to form the pillar portions 34 are each provided to a position that does not correspond to the sensing section 28 in the vertical direction. The number of pillar portions 34 is the same as the number of sensing sections 28b of the second pressure sensor 22b, that is, 25 in total with five×five (length×width). Note that the number of pillar portions 34 can be changed as appropriate.

The viscoelastic body layer 810 has a thickness of, for example, between about 1000 μm and about 5000 μm. A height of the pillar portion 34 in the vertical direction (that is, a depth of the gap 33 in the form of a groove) is, for example, equal to or greater than 20%, equal to or greater than 25%, equal to or greater than 30%, equal to or greater than 35%, equal to or greater than 40%, or equal to or greater than 45% of the thickness of the viscoelastic body layer 810. Note that it is not a problem if the pillar portion 34 has a large height (for example, 100% of the thickness of the viscoelastic body layer 810). However, there is a possibility that the pillar portion 34 will not work effectively if the height of the pillar portion 34 is too small (for example, a height less than 20% of the thickness of the viscoelastic body layer 810).

The area (in the in-plane direction) of a lower surface of the pillar portion 34 (a portion of the pillar portion 34 that is brought into contact with the first pressure sensor 22a) is set according to the area of the sensing section 28a of the first pressure sensor 22a, and is, for example, the area equal to the area of the sensing section 28a.

Typically, the viscoelastic body layer 810 is made of a viscoelastic material that has viscoelastic characteristics. Examples of a material used for the separation layer 810 include a silicon gel, a urethane gel, synthetic rubber, and foam. The various shapes illustrated in FIGS. 18 and 19 can be adopted for the shape of the viscoelastic body layer 810, as in the case of the separation layer 230 of the second embodiment described above.

As in the second embodiment described above, the sensor apparatus 60 of the present embodiment having the configuration described above also makes it possible to improve the sensitivity in detecting a shearing force. In other words, the viscoelastic body layer 810 includes the gap 33 in the present embodiment. Thus, when the shearing force Fs is applied, the viscoelastic body layer 810 is locally distorted in the in-plane direction in which the shearing force Fs is caused, and the distortion is less transmitted to a portion other than the locally distorted portion. The state of being easily locally distorted (the shearing stress a) is uniformly provided regardless of a point in the in-plane direction. Thus, in the present embodiment, the sensitivity in detecting the shearing force Fs is uniformly provided in the in-plane direction.

Fourth Embodiment

Figure 21:
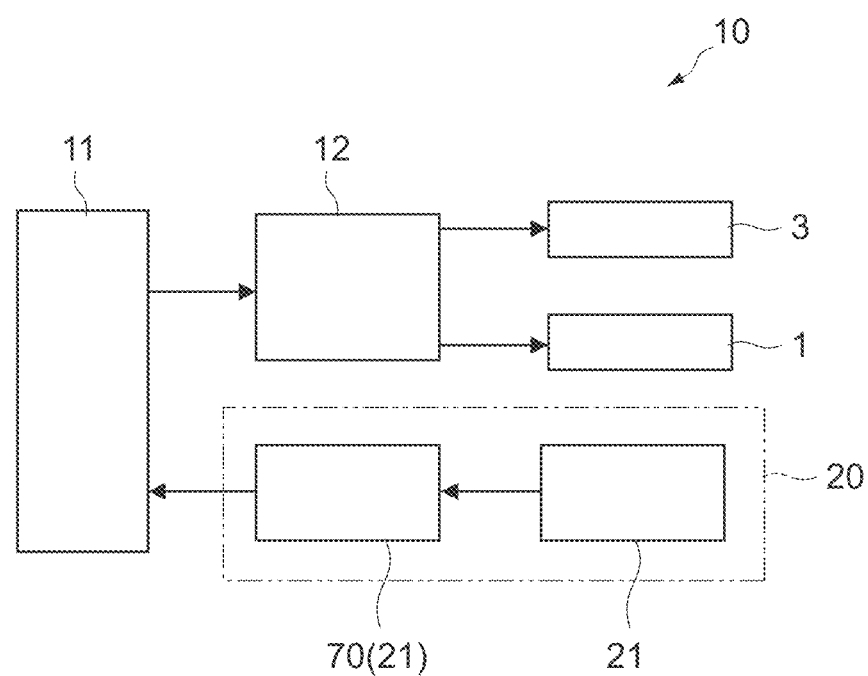
FIG. 21 is a block diagram illustrating a configuration of the robotic apparatus including the sensor apparatus according to the first embodiment.

Subsequently, a fourth embodiment of the present technology is described. FIG. 21 is a block diagram illustrating a configuration of the robotic apparatus 10 (refer to FIG. 1) including the sensor apparatus 20 according to the first embodiment.

The robotic apparatus 10 includes a controller 11, and a drive section 12 that drives, for example, the arm portion 1 and the hand portion 3. Typically, the controller 11 includes a computer that includes a CPU and a memory, and can execute, on the basis of input signals from various sensors, a control program used to operate the robotic apparatus 10.

The sensor apparatus 20 is one of the various sensors, and is attached to a holding surface, of the hand portion 3, that is used to hold a target object. In the sensor apparatus 20, a pressing force (a pressure distribution, a holding force (a vertical load), or a shearing force) that acts on the sensing surface is detected by the sensor section 21, a value of the pressing force is calculated by the computation element 70, and the calculated value is input to the controller 11. The controller 11 generates a drive signal used to control positions of the arm portion 1 and the hand portion 3 (the finger portions 3a) on the basis of the input signal from the computation element 70, and outputs the generated drive signal to the drive section 12. Typically, the drive section 12 is an actuator such as an electric motor or a fluid pressure cylinder, and drives, for example, the arm portion 1 and the hand portion 3 on the basis of the drive signal from the controller 11.

Figure 22:
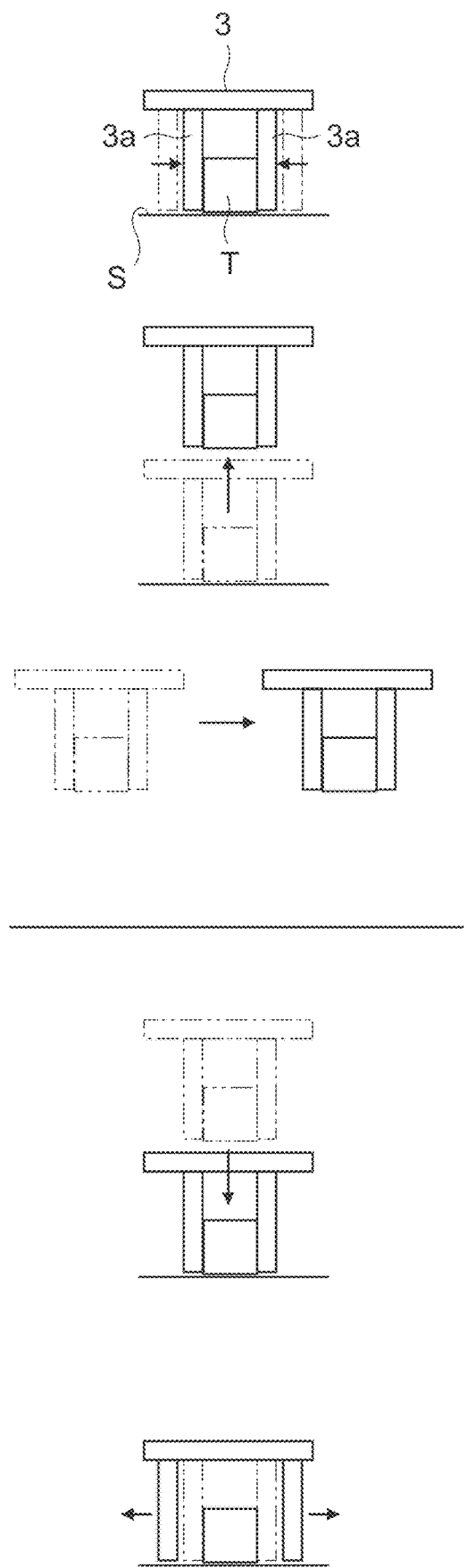
FIG. 22 is a diagram used to describe a procedure of processing performed by a controller of the robotic apparatus.
Figure 22:
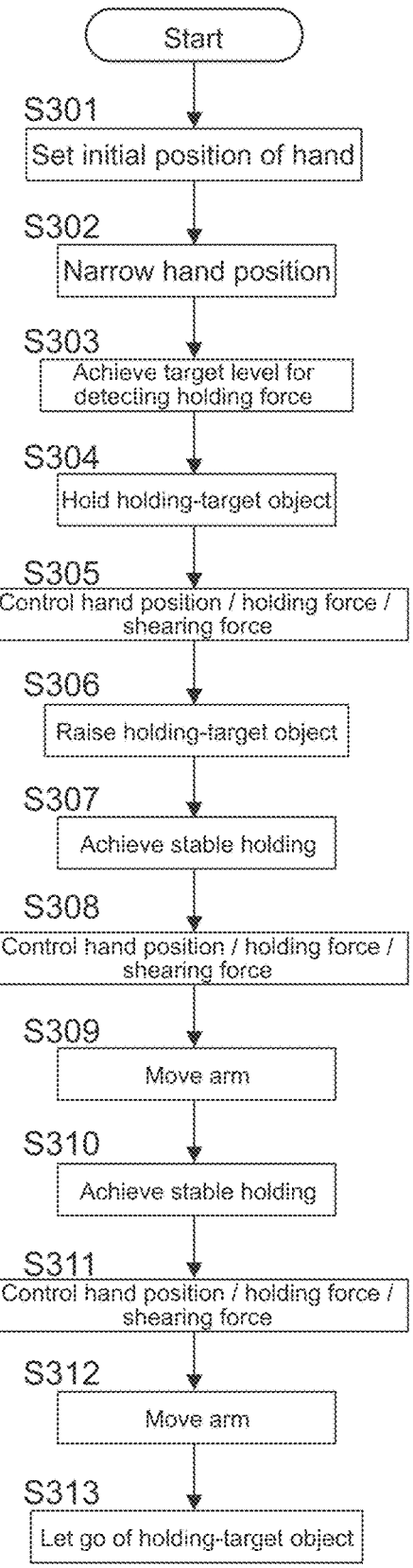

As an example, an example of operation of carrying a target object T placed on an on-placement surface S to another location, and a procedure of processing performed by the controller 11 are described, as illustrated in FIG. 22.

[Operation of Holding Target Object]

The controller 11 sets an initial position that is a position to hold the target object T, and then narrows a hand position (a facing distance between the finger portions 3a) (Steps 301 and 302).

When the finger portions 3a are brought into contact with the target object T, and a target level for detecting a holding force (typically, a pressing force that acts when the finger portions 3a are brought into contact with the target object T) is reached, the controller 11 performs control such that the target object T is held by the hand portion 3 (Steps 303 and 304).

Here, the controller 11 adjusts the position of the hand portion 3 (a pose of the hand portion 3 and the facing distance between the finger portions 3a) to control a holding force for holding the target object T, or a shearing force that acts on the sensor apparatus 20 (Step 305).

Then, the controller 11 controls, for example, the holding force of the hand portion 3 such that the target object T is raised to be stably held (Steps 306 and 307).

[Operation of Moving Target Object]

Subsequently, the controller 11 holds the hand portion 3, and further adjusts the holding force as necessary. Then, the controller 11 performs control such that the arm portion 1 is moved to a destination (Steps 308 and 309). Here, due to, for example, inertia associated with the movement of the arm portion 1, there may be a change in, for example, a shearing force that acts on the hand portion 3. The controller 11 adjusts the pose or the holding force of the hand portion 3 to perform control such that the stable holding of the target object T is maintained (Step 310).

Operation of Letting go of Target Object

When the target object T arrives at a target location, the controller 11 performs control such that the movement of the arm portion 1 is stopped. In this case, control is also performed such that the stable holding of the target object T is maintained when there is a change in, for example, a shearing force that acts on the hand portion 3, due to, for example, inertia. Then, an operation of lowering the arm is performed (Steps 311 and 312). When the target object T is placed on the on-placement surface S, the controller 11 stops the operation of lowering the arm portion 1, and cancels the holding operation performed by the hand portion 3 to perform control such that the target object T is let go (Step 313).

Figure 23:
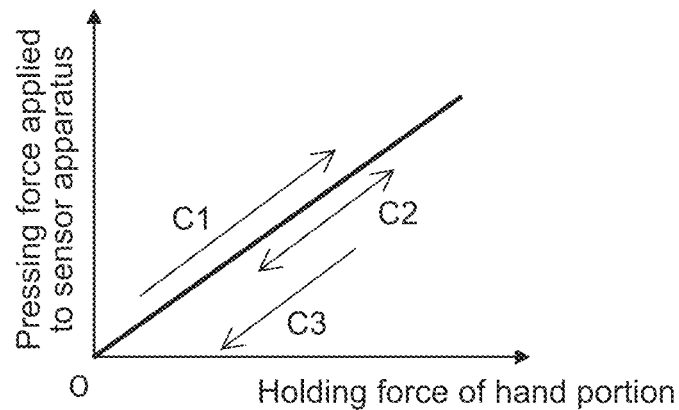
FIG. 23 illustrates a relationship between a pressing force applied to the sensor apparatus and a holding force of a hand portion.

There is a linear correlation between a pressing force applied to the sensor apparatus 20 and a holding force of the hand portion 3, as illustrated in FIG. 23, and the pressing force is increased in proportion to the holding force. A range of adjusting the holding force for holding the target object T differs upon the operation of holding the target object T, the operation of moving the target object T, and the operation of letting go of the target object T. Typically, the holding force is adjusted in a range of an arrow C1 upon the holding operation, in a range of an arrow C2 upon the moving operation, and in a range of an arrow C3 upon the operation of letting go.

Figure 24:
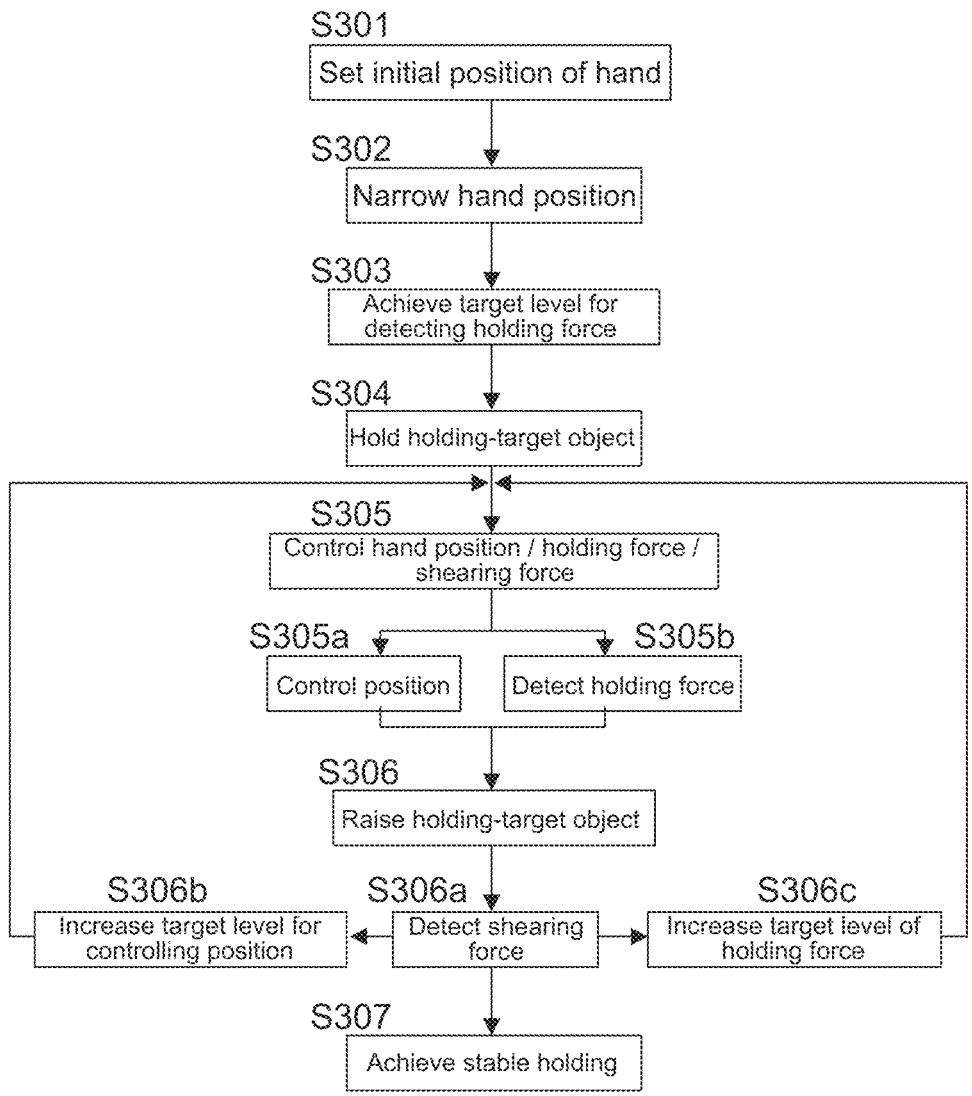
FIG. 24 is a flowchart illustrating a processing procedure of an operation of holding a target object that is performed by the robotic apparatus.

FIG. 24 is a flowchart illustrating a processing procedure of the operation of holding the target object T in detail.

Step 305 includes Step 305a performed to control a hand position, and Step 305b performed to detect a holding force. For example, the holding force is determined on the basis of the vertical load Fz output by the sensor apparatus 20 and an in-plane distribution of the shearing force Fs, and the hand portion 3 is controlled such that the holding force exhibits a target level.

Further, Step 306 includes Step 306a performed to detect the shearing force Fs, and Steps 306b and 306c performed to reset a position and a pose of the hand portion or a target level of the holding force on the basis of the shearing force Fs such that a holding operation is stabilized.

Figure 25:
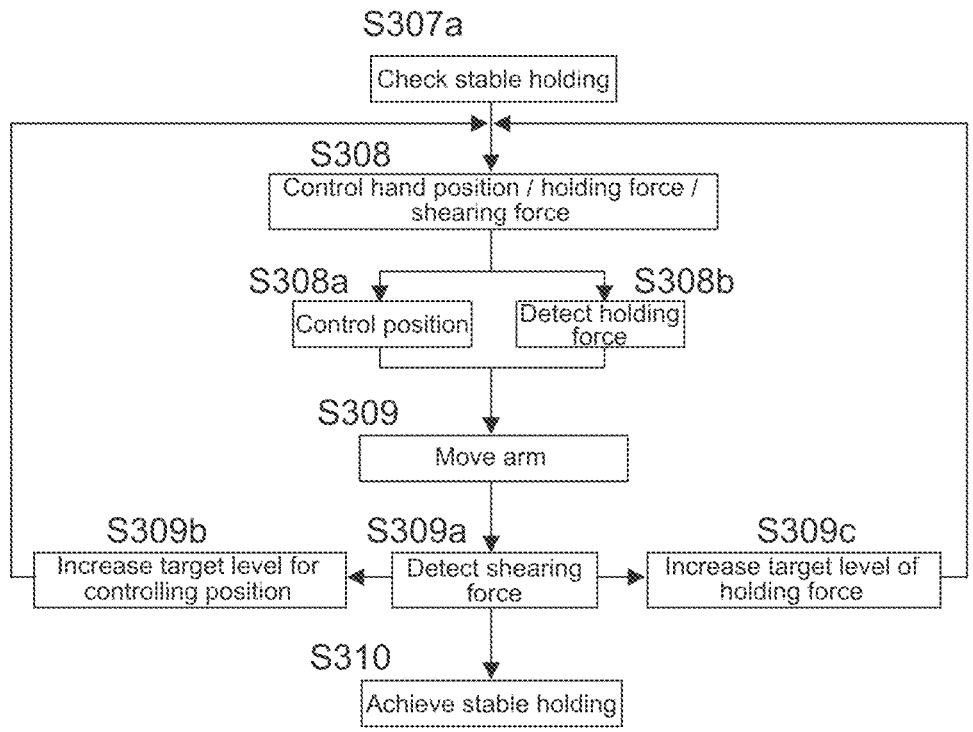
FIG. 25 is a flowchart illustrating a processing procedure of an operation of moving the target object that is performed by the robotic apparatus.

FIG. 25 is a flowchart illustrating a processing procedure of the operation of moving the target object T in detail.

Checking whether the target object T is stably held is included as Step 307a. Step 308 includes Step 308a performed to control the hand position, and Step 308b performed to detect the holding force.

Further, Step 309 includes Step 309a performed to detect the shearing force Fs, and Steps 309b and 309c performed to reset the position and the pose of the hand portion or the target level of the holding force on the basis of the shearing force Fs such that the holding operation is stabilized.

Figure 26:
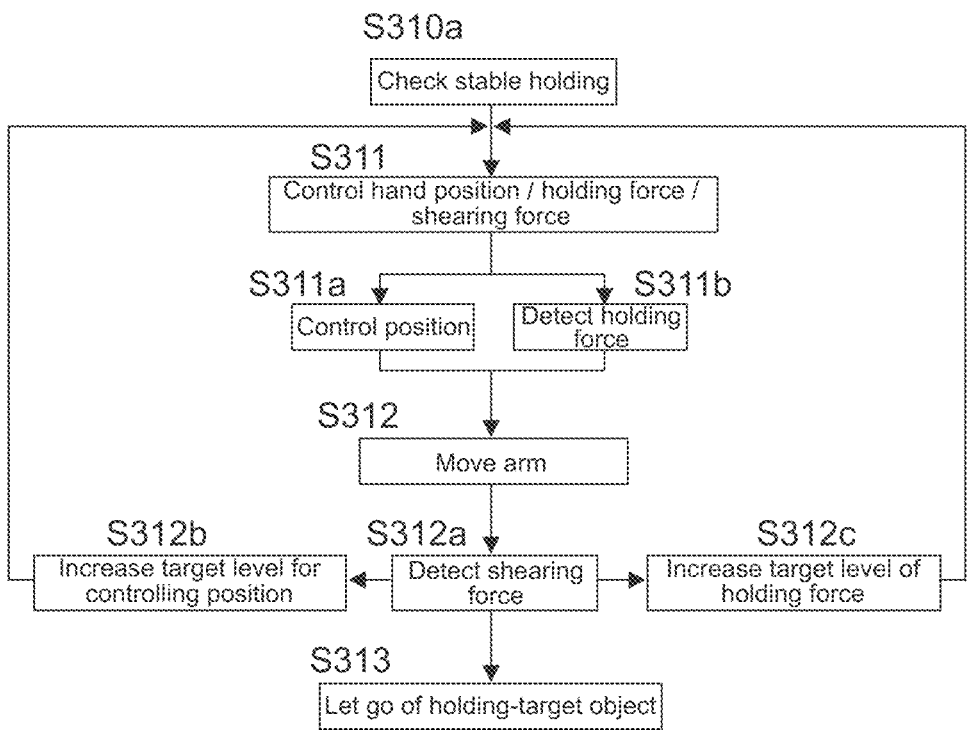
FIG. 26 is a flowchart illustrating a processing procedure of an operation of letting go of the target object that is performed by the robotic apparatus.

FIG. 26 is a flowchart illustrating a processing procedure of the operation of letting go of the target object T in detail.

Checking whether the target object T is stably held is included as Step 310a. Step 311 includes Step 311a performed to control the hand position, and Step 311b performed to detect the holding force.

Further, Step 312 includes Step 312a performed to detect the shearing force Fs, and Steps 312b and 312c performed to reset the position and the pose of the hand portion or the target level of the holding force on the basis of the shearing force Fs such that the holding operation is stabilized.

Figure 27:
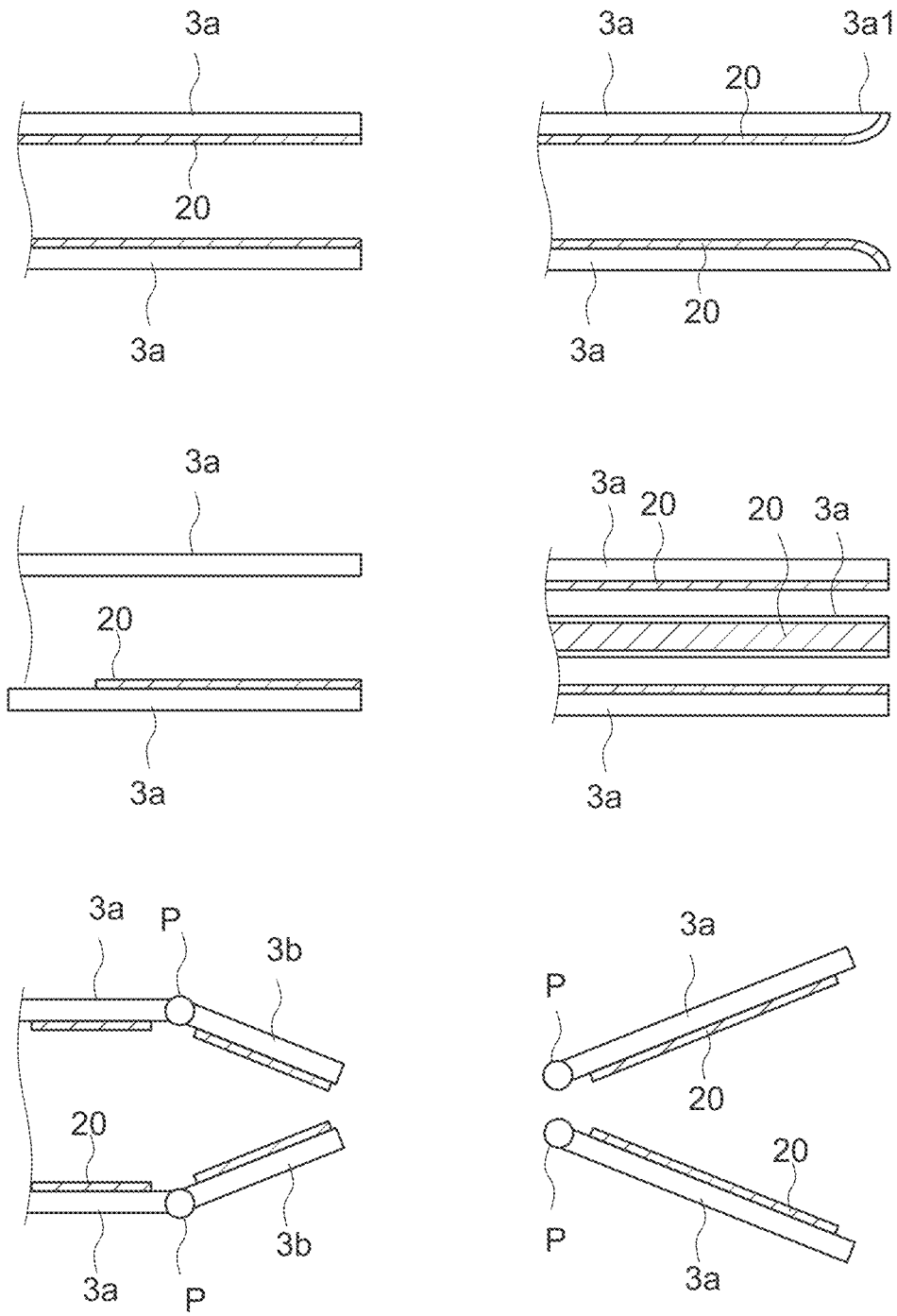
FIG. 27 illustrates side views of primary portions illustrating various examples of a configuration of the hand portion.

FIG. 27 illustrates side views of primary portions illustrating various examples of a configuration of the hand portion 3. A hatched region represents the sensor apparatus 20 in the figure.

FIG. 27 illustrates, on the upper left, a two-finger gripper of parallel plates, where the sensor apparatus 20 is arranged on an inner surface of each finger portion 3a.

FIG. 27 also illustrates, on the upper right, a two-finger gripper of parallel plates. This two-finger gripper of parallel plates is different from that on the upper left in that a tip 3al of each finger portion 3a is curved. The sensor apparatus 20 is arranged on the inner surface of the finger portion 3a to cover the tip 3al of the finger portion 3a, and this results in being able to detect not only the holding force but also a force of contact with the tip 3al.

FIG. 27 also illustrates, on the left in a middle portion, a two-finger gripper of parallel plates. This is an example of only arranging the sensor apparatus 20 on one of the finger portions 3a.

FIG. 27 illustrates, on the right in the middle portion, a three-finger gripper, where the sensor apparatus 20 is arranged on the inner surface of each finger portion 3a.

FIG. 27 illustrates, on the lower left, a two-finger gripper. This is an example in which a fingertip 3b is connected to a tip of each finger portion 3a through a pivotable portion P. In this case, the sensor apparatus 20 is arranged on the inner surface of each finger portion 3a and on an inner surface of each fingertip 3b.

Further, FIG. 27 illustrates, on the lower right, a two-finger rotatable gripper that can pivot on the pivotable portion P. This is an example of arranging the sensor apparatus 20 on the inner surface of each finger portion 3a.

Figure 28:
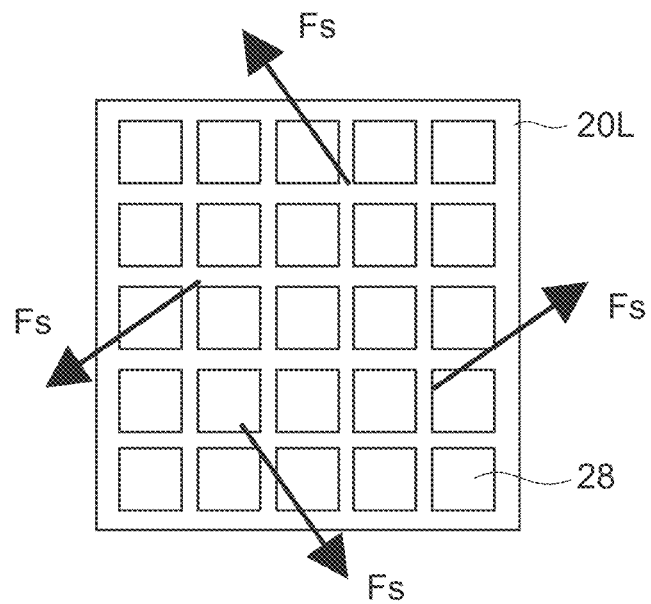
FIG. 28 illustrated an example of applying the present technology to a two-finger gripper of parallel plates.
Figure 28:
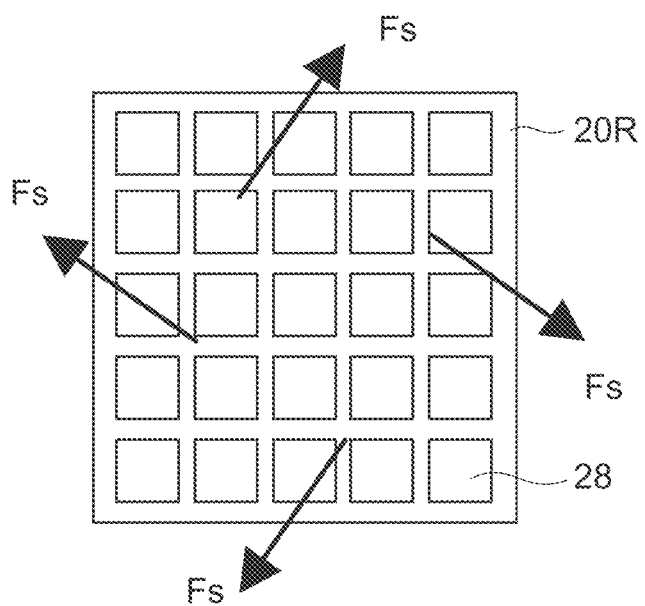

FIG. 28 illustrates an example of an in-plane distribution of the shearing force Fs detected by the sensor apparatus 20 arranged on the inner surface of each finger portion 3a of a two-finger gripper of parallel plates. Here, it is assumed that the sensor apparatus arranged on the finger portion 3a situated on one side (for example, on the left) is a sensor apparatus 20L, and the sensor apparatus arranged on the finger portion 3a situated on the other side (for example, on the right) is a sensor apparatus 20R. When a slip is caused that causes a target object held between the finger portions 3a to be rotated about an axis parallel to a holding direction, the sensor apparatuses 20L and 20R detect respective in-plane distributions of the shearing force Fs, as illustrated in the figure. In this case, in-plane distributions of the shearing force Fs that are symmetric to each other are detected by the sensor apparatus 20L and 20R. Thus, an in-plane distribution of the shearing force Fs acting on the finger portions 3a can be detected with a high degree of accuracy.

Fifth Embodiment

Figure 29:
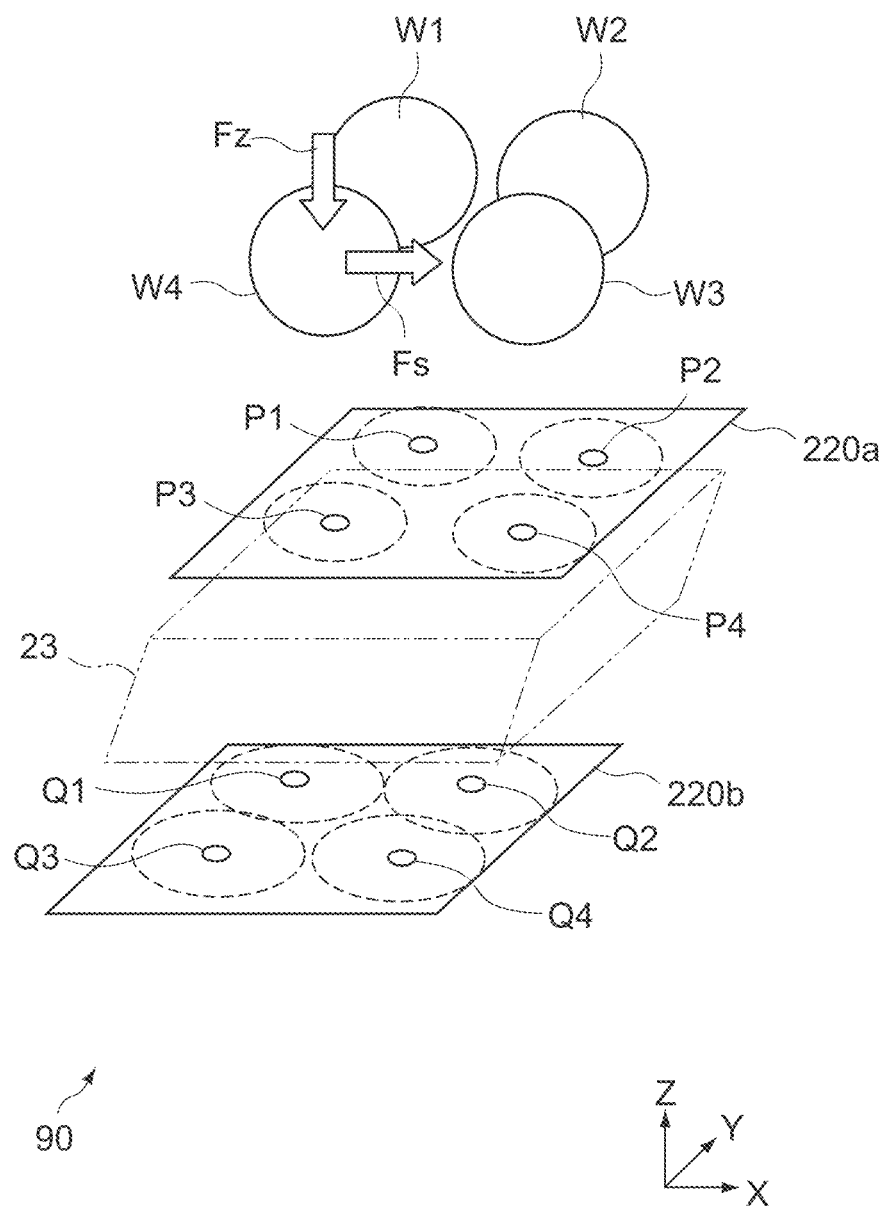
FIG. 29 is a schematic perspective view of a sensor apparatus according to a fifth embodiment of the present technology.

FIG. 29 is a schematic perspective view of a sensor apparatus 90 according to a fifth embodiment of the present technology. As in the first embodiment, the sensor apparatus 90 of the present embodiment includes a first pressure sensor 220a situated on an upper-layer side that corresponds to a sensing-surface side, a second pressure sensor 220b situated on a lower-layer side, and the separation layer 23 arranged between the first pressure sensor 220a and the second pressure sensor 220b. Note that an illustration of the viscoelastic body layer 81 arranged on an upper-layer side of the first pressure sensor 220a is omitted.

Here, through each of four pushers W1 to W4, a vertical load Fz and a shearing force Fs simultaneously act on the sensor apparatus 90 in the Z-axis direction and in the X-axis direction, respectively. A point P1 on the first pressure sensor 220a and a point Q1 on the second pressure sensor 220b represent center positions of detecting pressures acting through the pusher W1 (pressure center positions), a point P2 on the first pressure sensor 220a and a point Q2 on the second pressure sensor 220b represent center positions of detecting pressures acting through the pusher W2 (pressure center positions), a point P3 on the first pressure sensor 220a and a point Q3 on the second pressure sensor 220b represent center positions of detecting pressures acting through the pusher W3 (pressure center positions), and a point P4 on the first pressure sensor 220a and a point Q4 on the second pressure sensor 220b represent center positions of detecting pressures acting through the pusher W4 (pressure center positions).

Figure 30:
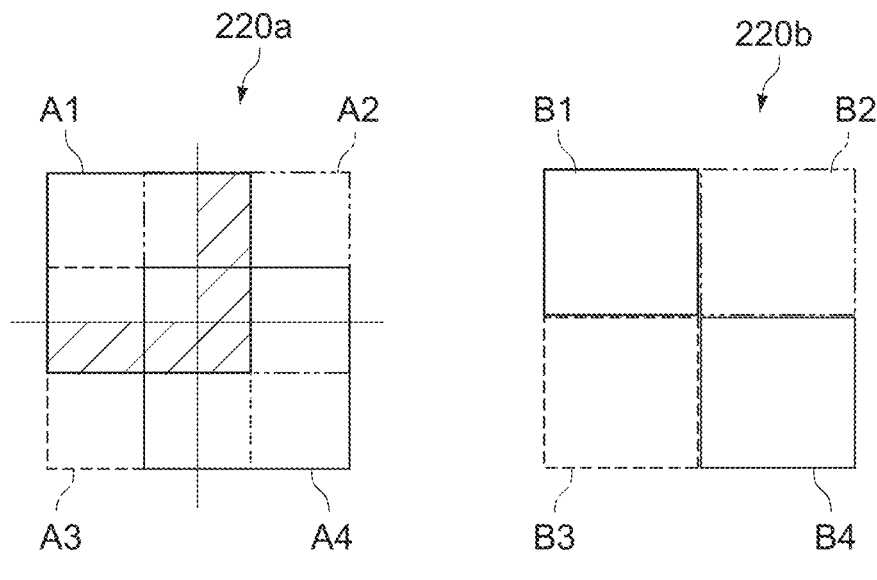
FIG. 30 is a schematic plan view that is parallel to an XY plane and illustrates an example of dividing each of a first pressure sensor and a second pressure sensor that are included in the sensor apparatus.

The present embodiment is different from the first embodiment described above in that each of the first pressure sensor 220a and the second pressure sensor 220b is divided into a plurality of detection regions. FIG. 30 is a schematic plan view that is parallel to an XY plane and illustrates an example of dividing each of the first pressure sensor 220a and the second pressure sensor 220b.

As illustrated in FIG. 30, the first pressure sensor 220a is divided into four detection regions A1 to A4, and likewise, the second pressure sensor 220b is divided into four detection regions B1 to B4. A vertical load Fz and a shearing force Fs that act on the detection region A1 of the first pressure sensor 220a through the pusher W1 are detected in the detection region B1 of the second pressure sensor 220b. Likewise, a vertical load Fz and a shearing force Fs that act on the detection region A2 of the first pressure sensor 220a through the pusher W2 are detected in the detection region B2 of the second pressure sensor 220b, a vertical load Fz and a shearing force Fs that act on the detection region A3 of the first pressure sensor 220a through the pusher W3 are detected in the detection region B3 of the second pressure sensor 220b, and a vertical load Fz and a shearing force Fs that act on the detection region A4 of the first pressure sensor 220a through the pusher W4 are detected in the detection region B4 of the second pressure sensor 220b.

The first pressure sensor 220a and the second pressure sensor 220b are respectively divided into the plurality of detection regions A1 to A4 and the plurality of detection regions B1 to B4, and this makes it possible to accurately detect a load and a shearing force that act on each detection region, without a certain detection region being affected by another detection region.

Figure 31:
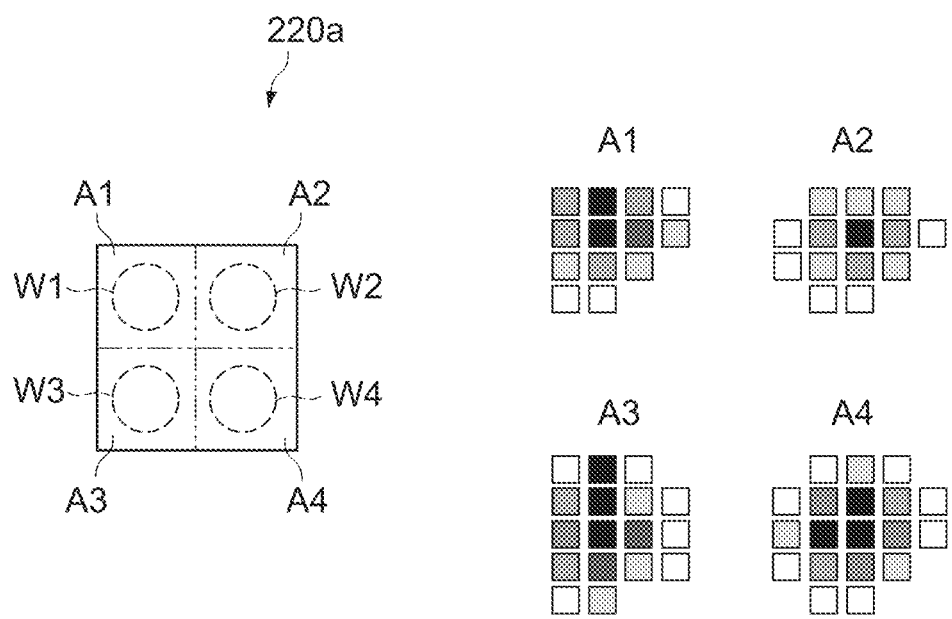
FIG. 31 schematically illustrates a distribution of a pressure that acts on each of the detection regions of the first pressure sensor.

For example, FIG. 31 schematically illustrates distributions of pressures that respectively act on the detection regions A1 to A4 of the first pressure sensor 220a through the respective pushers W1 to W4. On the right in the figure, rectangular regions of a plurality of rectangular regions in each of the detection regions A1 to A4 each correspond to the sensing section 28 (refer to FIG. 3) corresponding to a node, and their pressure detection values are represented with light and dark (darker represents a higher pressure detection value, and lighter represents a lower pressure detection value).

Figure 32:
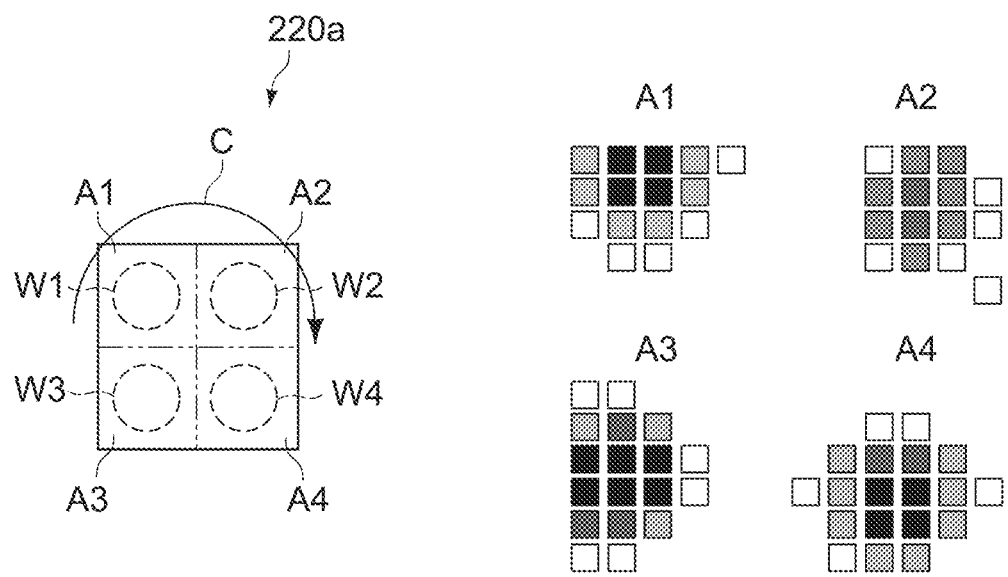
FIG. 32 schematically illustrates a distribution of the pressure acting on each of the detection regions of the first pressure sensor.
Figure 33:
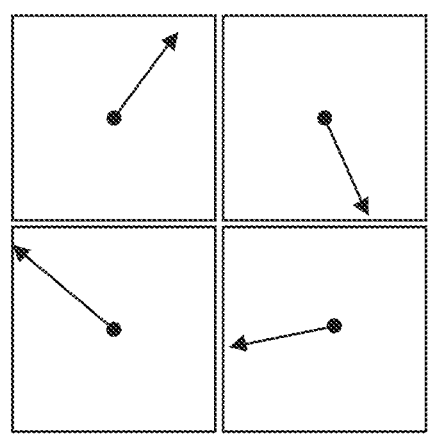
FIG. 33 is a diagram used to describe shearing forces detected in the respective detection regions.

When the pushers W1 to W4 are rotated about the same rotational axis in this state while the pushers W1 to W4 are being pressed with the hand, as indicated by an arrow C on the left in FIG. 32, distributions of pressures respectively acting on the detection regions A1 to A4 are changed, as illustrated, for example, on the right in FIG. 32. In other words, this shows that, in this case, a region that exhibits a high pressure is increased in each of the detection areas A1 to A4 and pressure center positions in the respective detection regions A1 to A4 are respectively moved along movement directions of the pushers W1 to W4. Further, FIG. 33 illustrates in-plane distributions of shearing forces that are respectively detected in the four detection regions (regions 1 to 4) and are respectively determined also in consideration of temporal changes in the respective pressure center positions in the detection regions B1 to B4 of the second pressure sensor 220b.

In the present embodiment, the detection regions A1 to A4 of the first pressure sensor 220a are set such that a portion of a certain region overlaps a portion of another region. When a detection surface of the first pressure sensor 220a is equally divided into four with two in length and two in width, portions of detection region A1 respectively overlap a portion of the other detection region A2 adjacent in a width direction, and a portion of the other detection region A3 adjacent in a length direction, as indicated by hatching, for example, on the left in FIG. 30. This results in an increase in the number of sensors (the number of sensing sections 28) in each detection region. This makes it possible to, for example, prevent pressure detection data on a peripheral edge of the detection region from missing and improve the accuracy in detecting the pressure center positions P1 to P4.

Note that, without being limited thereto, division may be performed without the detection regions A1 to A4 not overlapping each other, as in the case of the division regions B1 to B4 of the second pressure sensor 220b.

The first pressure sensor 220a is divided into the four detection regions A1 to A4 and the second pressure sensor 220b is divided into the four detection regions B1 to B4. Without being limited thereto, the first pressure sensor 220a and the second pressure sensor 220b may each be divided into two, three, or five or more regions.

With respect to the detection regions A1 to A4 and the detection regions B1 to B4, the detection numbers and sizes may be set in advance, and may be set to be changeable according to, for example, the number of loads acting on the first pressure sensor 220*a* or a position of the load. In this case, a setting of a detection region can be optimized when a load that acts on the sensor apparatus 90 is changed every moment. This makes it possible to detect a highly accurate distribution of pressure or a highly accurate distribution of a shearing force.

Note that there is a possibility that each sensing section 28 included in each of the first pressure sensor 220*a* and the second pressure sensor 220*b* will not exhibit a linear change in capacitance with respect to a pressing force. Thus, a correction algorithm used to linearly approximate a change in capacitance that is exhibited by the sensing section 28 with respect to a pressing force may be adopted.

Figure 34:
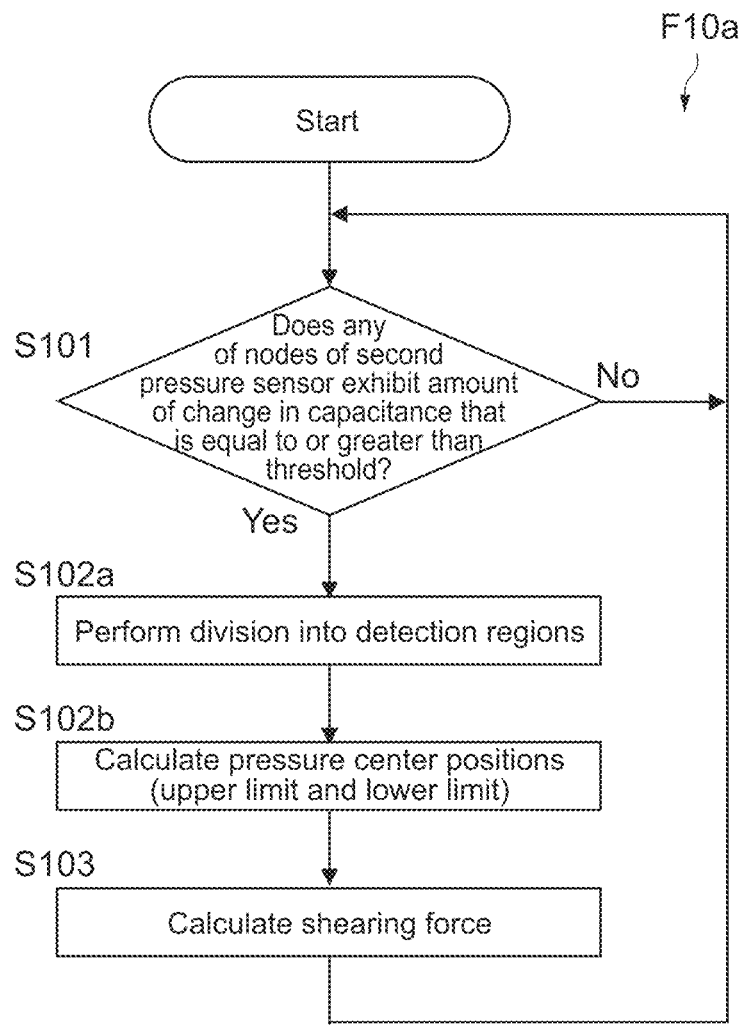
FIG. 34 is a flowchart illustrating a procedure of processing of calculating a shearing force detected in each detection region.
Figure 35:
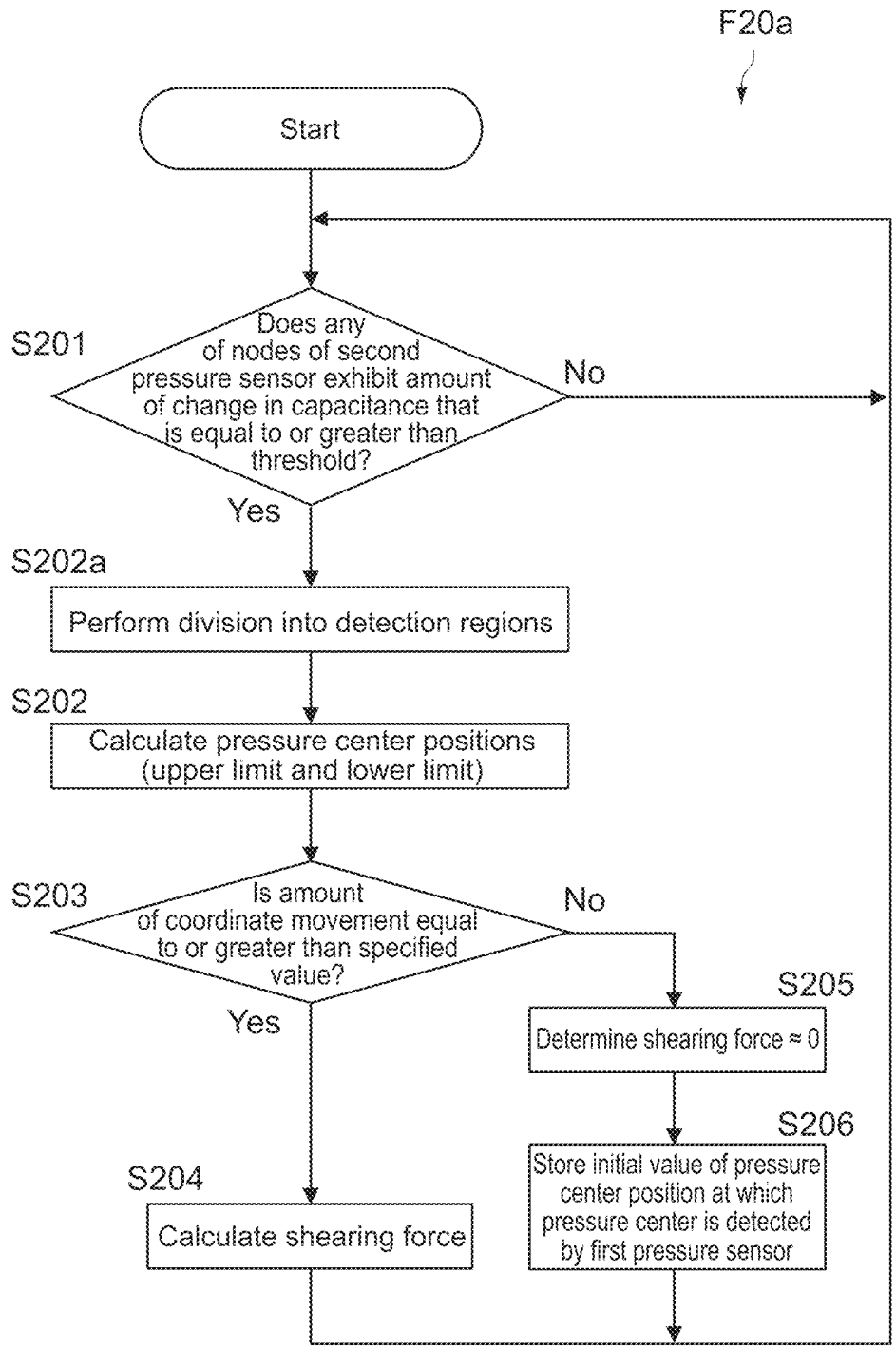
FIG. 35 is a flowchart illustrating a procedure of processing of calculating a shearing force detected in each detection region.

FIGS. 34 and 35 are flowcharts each illustrating a procedure of processing of calculating a shearing force detected in each of the detection regions A1 to A4 and B1 to B4, the processing being performed by the computation element 70 (refer to FIG. 3).

A processing procedure F10a illustrated in FIG. 34 is a processing procedure similar to the processing procedure F10 illustrated in FIG. 7, and a processing procedure F20a illustrated in FIG. 35 is a processing procedure similar to the processing procedure F20 illustrated in FIG. 12.

In both of the cases, when one of the sensing sections 28 (nodes) of the second pressure sensor 220*b* exhibits an amount of change in capacitance that is equal to or greater than a threshold (Yes in Step 101, 201), the first pressure sensor 220*a* and the second pressure sensor 220*b* are respectively divided into the plurality of detection regions A1 to A4 and the plurality of detection regions B1 to B4 (Step 102*a*, 202*a*). Thereafter, the pressure center positions P1 to P4 and Q1 to Q4 are calculated for the respective detection regions obtained by the division to calculate shearing forces Fs acting on the respective detection regions (Step 102*b*, 202*b*, and Step 103, 204).

Note that the sensor apparatus 90 of the present embodiment can be applied to not only the sensor apparatus described in the first embodiment but also the sensor apparatuses of the second to fourth embodiments.

EXAMPLES

With respect to the sensor apparatus 20 illustrated in FIG. 2, a plurality of sample sensor apparatuses were produced, where thicknesses, sizes, degrees of hardness, and the like of the separation layers 23 of the plurality of sample sensor apparatuses are different from each other, and thicknesses, sizes, degrees of hardness, and the like of the viscoelastic body layers 81 of the plurality of sample sensor apparatuses are different from each other. The mutual interference between pressing points in the separation layer 23 and the minimum load sensitivity were evaluated using the approach illustrated in FIG. 11. Note that the same material was used for the same layer of the sensor apparatus 20 in respective Examples indicated below. Further, in the following description, the thickness, the size in length, and the size in width respectively refer to dimensions in the directions of the Z axis, the X axis, and the Y-axis in FIG. 2, and the degree of thickness refers to (a degree of) penetration.

Example 1

The sensor apparatus 20 including the viscoelastic body layer 81 having a thickness of 4.0 mm, a length size of 29 mm, a width side of 29 mm, and the hardness of 60 degrees, and the separation layer 23 having a thickness of 4.0 mm, a length size of 29 mm, a width side of 29 mm, and the hardness of 100 degrees, was produced, and the mutual interference between pressing points in the separation layer 23 and the minimum detection sensitivity were measured.

Note that the sensor section 21 had an outer shape having a size of 29 mm in length and 29 mm in width, where the number of sensing sections 28 (nodes) of the first pressure sensor 22*a* (length×width) was 12×12 (two millimeters square), and the number of sensing sections 28 (nodes) of the second pressure sensor 22*b* (length×width) was 8×8 (three millimeters square).

With respect to a condition for measuring the mutual interference, it is assumed that, as in the example of FIG. 11, a diameter of a contact surface of each of the pushers Wa and Wb is 6 mm, a distance between centers of the pushers Wa and Wb is 12 mm, a magnitude of a vertical load Fz is 5 N, and an amount of movement of the pusher Wa is 3 mm, and an amount-of-deformation ratio (an amount of deformation for Wb/an amount of deformation for Wa) of respective pressing points in the separation layer 23 is set to be the mutual interference (%), the amount of deformation being an amount of deformation in the Z-axis direction. Further, both measurement using the processing procedure F10 illustrated in FIG. 7 and measurement using the processing procedure F20 illustrated in FIG. 12 are performed in order to calculate the mutual interference.

Figure 36:
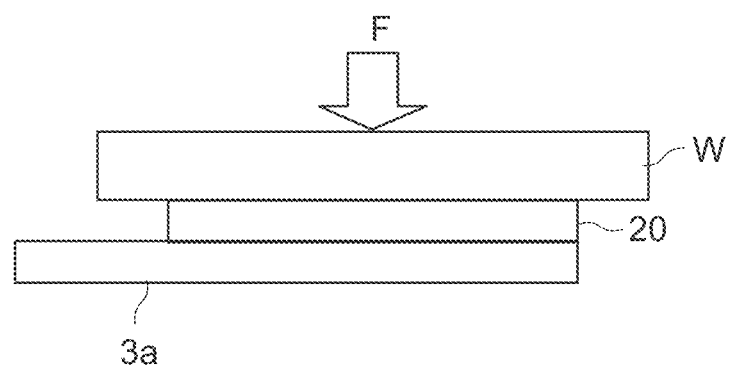
FIG. 36 is a diagram used to describe a method for measuring a minimum detection sensitivity in the sensor apparatus.

With respect to a condition for measuring the minimum detection sensitivity, a pusher W having a larger area than a sensing surface of the sensor apparatus 20 was arranged on the sensing surface, as illustrated in FIG. 36, and a vertical load F was applied to the sensor section 20 through the pusher W. Further, a minimum vertical load F (N) with which a significant pressing force is detected by the sensor apparatus 20 was set to be the minimum detection sensitivity.

A measurement result is given in Table 2. The measurement result shows that the mutual interference calculated by the processing procedure F20 was 20%, the mutual interference calculated by the processing procedure F10 was 60%, and the minimum detection sensitivity was 2.5 N.

Example 2

The mutual interference between pressing points in the separation layer 23 of the sensor apparatus 20 and the minimum detection sensitivity were measured under the same condition as Example 1 except that the viscoelastic body layer 81 had a thickness of 1.0 mm.

A measurement result shows, as given in Table 2, that the mutual interference calculated by the processing procedure F20 was 10%, the mutual interference calculated by the processing procedure F10 was 60%, and the minimum detection sensitivity was 1.6 N.

Example 3

The mutual interference between pressing points in the separation layer 23 of the sensor apparatus 20 and the minimum detection sensitivity were measured under the same condition as Example 1 except that the viscoelastic body layer 81 had a thickness of 1.0 mm and the hardness of 100 degrees.

A measurement result shows, as given in Table 2, that the mutual interference calculated by the processing procedure F20 was 5%, the mutual interference calculated by the processing procedure F10 was 60%, and the minimum detection sensitivity was 1.4 N.

Example 4

The mutual interference between pressing points in the separation layer 23 of the sensor apparatus 20 and the minimum detection sensitivity were measured under the same condition as Example 1 except that the viscoelastic body layer 81 had a thickness of 1.0 mm, a length size of 24 mm, a width size of 24 mm, and the hardness of 120 degrees.

A measurement result shows, as given in Table 2, that the mutual interference calculated by the processing procedure F20 was 2%, the mutual interference calculated by the processing procedure F10 was 60%, and the minimum detection sensitivity was 1.0 N.

Example 5

The mutual interference between pressing points in the separation layer 23 of the sensor apparatus 20 and the minimum detection sensitivity were measured under the same condition as Example 1 except that the viscoelastic body layer 81 had a thickness of 1.0 mm, a length size of 20 mm, a width size of 20 mm, and the hardness of 120 degrees.

A measurement result shows, as given in Table 2, that the mutual interference calculated by the processing procedure F20 was 2%, the mutual interference calculated by the processing procedure F10 was 60%, and the minimum detection sensitivity was 0.7 N.

Example 6

The mutual interference between pressing points in the separation layer 23 of the sensor apparatus 20 and the minimum detection sensitivity were measured under the same condition as Example 1 except that the viscoelastic body layer 81 had a thickness of 1.0 mm, a length size of 20 mm, a width size of 20 mm, and the hardness of 120 degrees, and the separation layer 230 had the hardness of 120 degrees.

A measurement result shows, as given in Table 2, that the mutual interference calculated by the processing procedure F20 was 2%, the mutual interference calculated by the processing procedure F10 was 55%, and the minimum detection sensitivity was 0.7 N.

Example 7

The mutual interference between pressing points in the separation layer 23 of the sensor apparatus 20 and the minimum detection sensitivity were measured under the same condition as Example 1 except that the viscoelastic body layer 81 had a thickness of 2.0 mm, a length size of 20 mm, a width size of 20 mm, and the hardness of 120 degrees, and the separation layer 230 had the hardness of 120 degrees.

A measurement result shows, as given in Table 2, that the mutual interference calculated by the processing procedure F20 was 1%, the mutual interference calculated by the processing procedure F10 was 50%, and the minimum detection sensitivity was 1.0 N.

Example 8

The sensor apparatus 60 including the viscoelastic body layer 810 illustrated in FIG. 20 instead of the viscoelastic body layer 81 was produced. The viscoelastic body layer 810 of this Example had a thickness of 1.0 mm, a length size of 24 mm, a width size of 24 mm, and the hardness of 120 degrees, and the separation layer 23 had a thickness of 4.0 mm, a length size of 29 mm, a width size of 29 mm, and the hardness of 100 degrees. A plurality of pillar portions 34 (refer to FIG. 17) each having a shape of an inverted frustum of a quadrangular pyramid and including 12 pillar portions 34 in length and 12 pillar portions 34 in width is provided to the viscoelastic body layer 810, where the tip of each pillar portion 34 has a length size of 3.0 mm and a width size of 3.0 mm.

With respect to the sensor apparatus 60 having the configuration described above, the mutual interference between pressing points in the separation layer 23 and the minimum detection sensitivity were measured under the same condition as Example 1.

A measurement result shows, as given in Table 2, that the mutual interference calculated by the processing procedure F20 was 1%, the mutual interference calculated by the processing procedure F10 was 60%, and the minimum detection sensitivity was 0.7 N.

Comparative Example 1

The mutual interference between pressing points in the peeling layer 23 of the sensor apparatus and the minimum detection sensitivity were measured under the same condition as Examples except that the viscoelastic body layer 81 was omitted.

A measurement result shows, as given in Table 2, that the mutual interference calculated by the processing procedure F20 was not detectable. Further, the mutual interference calculated by the processing procedure F10 was 90% and the minimum detection sensitivity was 1.4 N.

TABLE 2

| | Viscoelastic body 81 | | | | Separation layer 23 | | | | Mutual interference calculated by processing procedure F20 | Mutual interference calculated by processing procedure F10 | Minimum detection sensitivity (N) |
|---|---|---|---|---|---|---|---|---|---|---|---|
| | Thickness (mm) | Length (mm) | Width (mm) | Hardness (Penetration) | Thickness (mm) | Length (mm) | Width (mm) | Hardness (Penetration) | | | |
| Comparative Example 1 | — | — | — | — | 4.0 | 29 | 29 | 100 degrees | Not detectable | 90% | 1.4 |
| Example 1 | 4.0 | 29 | 29 | 60 degrees | 4.0 | 29 | 29 | 100 degrees | 20% | 60% | 2.5 |
| Example 2 | 1.0 | 29 | 29 | 60 degrees | 4.0 | 20 | 29 | 100 degrees | 10% | 60% | 1.6 |
| Example 3 | 1.0 | 29 | 29 | 100 degrees | 4.0 | 29 | 29 | 100 degrees | 5% | 60% | 1.4 |
| Example 4 | 1.0 | 24 | 24 | 120 degrees | 4.0 | 29 | 29 | 100 degrees | 2% | 60% | 1.0 |
| Example 5 | 1.0 | 20 | 20 | 120 degrees | 4.0 | 29 | 29 | 100 degrees | 2% | 60% | 0.7 |
| Example 6 | 1.0 | 20 | 20 | 120 degrees | 4.0 | 29 | 29 | 120 degrees | 2% | 55% | 0 7 |

TABLE 2-continued

| | Viscoelastic body 81 | | | | Separation layer 23 | | | | Mutual interference calculated by processing procedure F20 | Mutual interference calculated by processing procedure F10 | Minimum detection sensitivity (N) |
|---|---|---|---|---|---|---|---|---|---|---|---|
| | Thickness (mm) | Length (mm) | Width (mm) | Hardness (Penetration) | Thickness (mm) | Length (mm) | Width (mm) | Hardness (Penetration) | | | |
| Example 7 | 2.0 | 20 | 20 | 120 degrees | 4.0 | 29 | 20 | 120 degrees | 1% | 50% | 1.0 |
| Example 8 | 1.0 | 24 | 24 | 120 degrees | 4.0 | 29 | 29 | 100 degrees | 1% | 60% | 0.7 |

As given in Table 2, the mutual interference calculated by the processing procedure F10 was lesser in Examples 1 to 8 in which the viscoelastic body layer 81 (the viscoelastic body layer 810 in Example 8) was included, compared to Comparative Example in which the viscoelastic body layer 81 was not included. This shows that Examples 1 to 8 make it possible to improve the sensitivity in detecting a distribution of a pressing force, compared to Comparative Example.

Further, Examples 1 to 8 make it possible to make the mutual interference lesser by the processing procedure F20 than by the processing procedure F10. This shows that the use of the processing procedure F20 makes it possible to detect, with a higher degree of accuracy, a distribution of a shearing force that acts on the sensor apparatus.

In particular, focused on Example 1 and Examples 2 to 8, making the viscoelastic body layer 81 (810) thinner than the separation layer 23 makes it possible to improve, using the processing procedure F20, the sensitivity in detecting a distribution of a shearing force and the minimum sensitivity in detecting a vertical load.

Furthermore, focused on Example 2 and Examples 3 to 8, making the viscoelastic body layer 81 (810) softer than the separation layer 23 (increasing the degree of penetration) makes it possible to improve, using the processing procedure F20, the sensitivity in detecting a distribution of a shearing force and the minimum sensitivity in detecting a vertical load.

Moreover, focused on Example 3 and Examples 4 to 8, making the viscoelastic body layer 81 (810) (the footprint of the viscoelastic body layer 81 (810) with respect to the sensor section 21) smaller in size than the separation layer 23 (the footprint of the separation layer 23 with respect to the sensor section 21) makes it possible to improve, using the processing procedure F20, the sensitivity in detecting a distribution of a shearing force and the minimum sensitivity in detecting a vertical load.

Further, focused on Example 4 and Example 8, forming, into a concave-convex surface, a contact surface of the viscoelastic body layer 810 that is brought into contact with the sensor section 21 makes it possible to improve, using the processing procedure F20, the sensitivity in detecting a distribution of a shearing force and the minimum sensitivity in detecting a vertical load, compared to when the contact surface is formed into a planar surface.

Other Embodiments

Second Viscoelastic Body Layer

Figure 37:
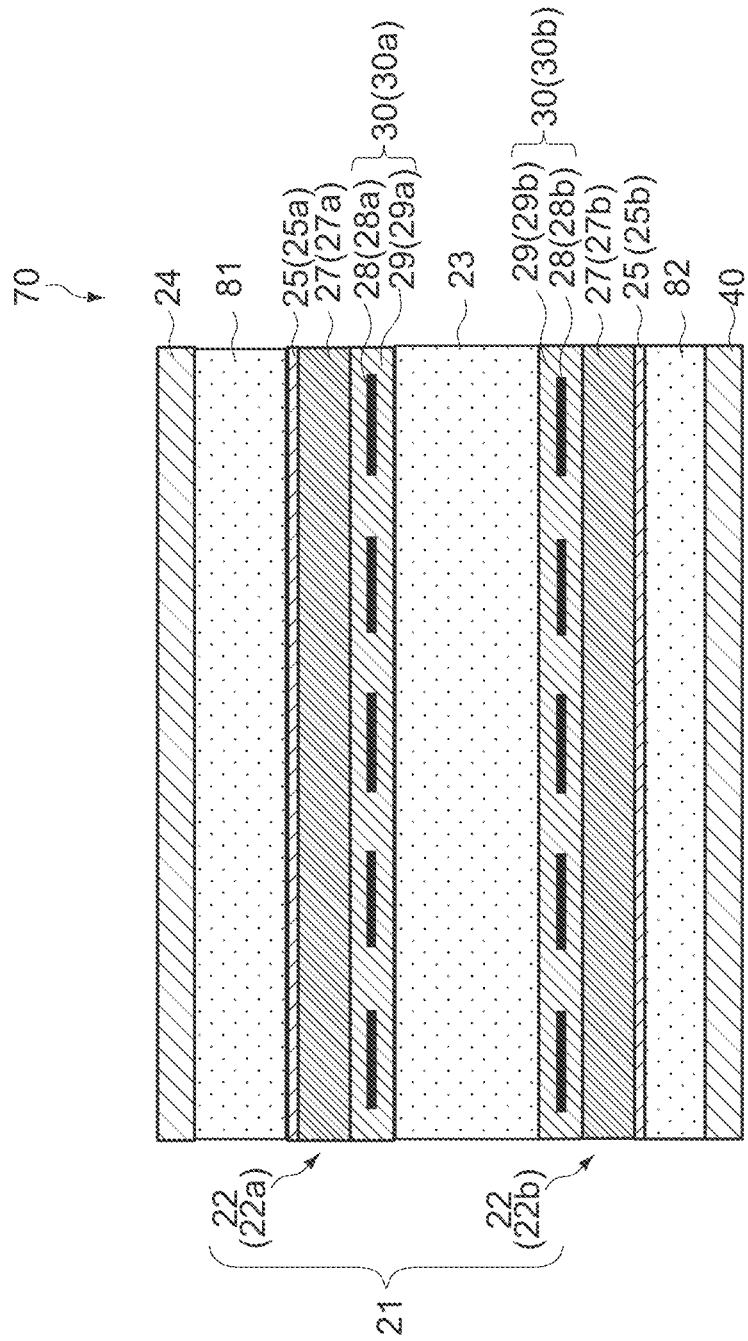
FIG. 37 is a cross-sectional side view of a modification of the configuration of the sensor apparatus according to the first embodiment.

The example in which the viscoelastic body layer 81, 810 (a first viscoelastic body layer) is arranged between the surface layer 24 and the sensor section 21 has been described in the respective embodiments above. However, the embodiments are not limited thereto. For example, a second viscoelastic body layer 82 that is made of a material similar to the material of the first viscoelastic body layer 81 may also be arranged between the sensor section 21 and the support 40, as illustrated in FIG. 37.

The second viscoelastic body layer 82 is arranged on a back surface of the second pressure sensor 22b of the sensor section 21, and is made of a viscoelastic material that can be deformed on the second pressure sensor 22b in the in-plane direction. This results in relaxing a constraint state between the sensor section 21 and the support 40, and thus in the separation layer 23 easily following a multiple-axis stress that acts on the first viscoelastic body layer 81. This makes it possible to further improve the accuracy in detecting a distribution of a shearing force.

In this case, the second viscoelastic body layer 82 favorably has a thickness equal to or less than a thickness of the first viscoelastic body layer 81, and more favorably has a thickness less than the thickness of the first viscoelastic body layer 81, in order to maintain the sensitivity in detecting a vertical load.

Protection Member

Figure 38:
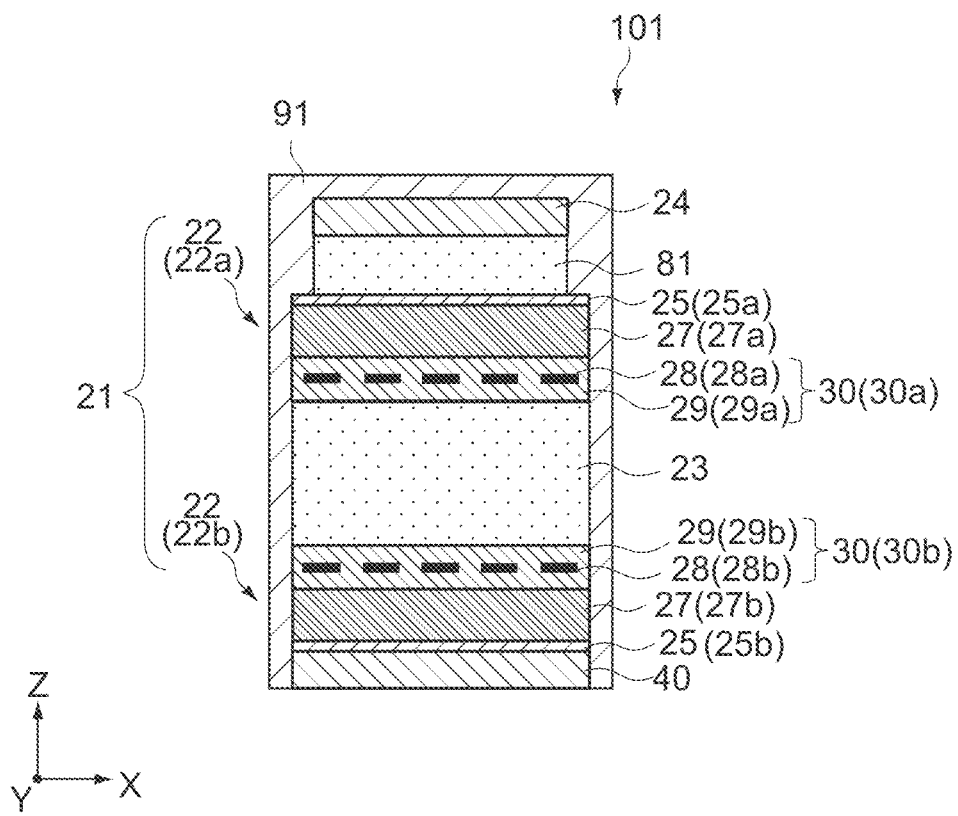
FIG. 38 illustrates a schematic cross-sectional side view of and a schematic plan view of a sensor apparatus that includes a protection member.
Figure 38:
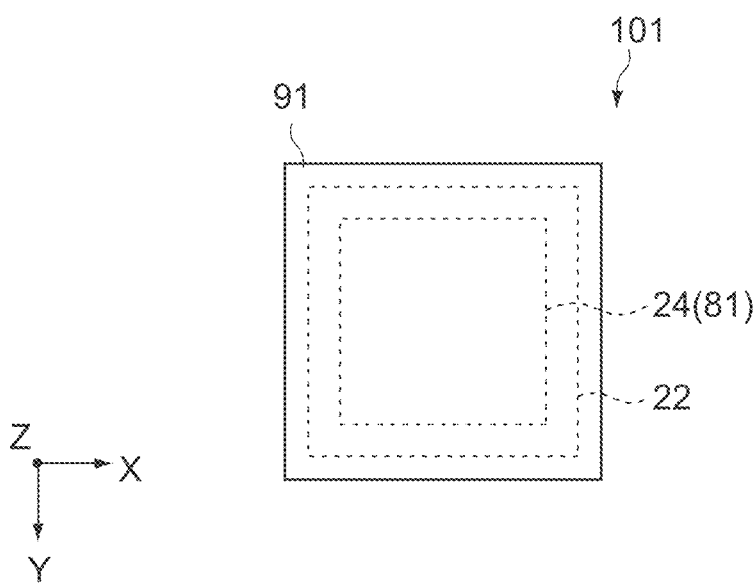

The sensor apparatus according to the present technology may include any waterproof function according to, for example, the use environment or the type of detection-target object. For example, FIG. 38 illustrates a schematic cross-sectional side view of and a schematic plan view of a sensor apparatus 101 that includes a waterproof protection member 91. In the following description, a structural element that is different from the structural elements of the first embodiment is primarily described. A structural element that is similar to the structural element of the first embodiment is denoted by a reference numeral similar to the reference numeral used in the first embodiment, and a description thereof is omitted or simplified.

First Configuration Example

The sensor apparatus 101 illustrated in FIG. 38 includes the protection member 91 covering the surface layer 24, the viscoelastic body layer 81, the first pressure sensor 22a, the separation layer 23, the second pressure sensor 22b, and the support 40. The protection member 91 may be wrapping made of a film material or coating made of a paste material. The protection member 91 is not particularly limited if the protection member 91 is a material that has the elasticity enabling the protection member 91 to follow an external force, and waterproof properties. Examples of the material of the protection member 91 include silicone rubber, urethane rubber, acrylic rubber, a silicon gel, a urethane gel, synthetic rubber, foam, silicon grease, polytetrafluoroethylene (PTFE) grease, an adhesive, and a pressure-sensitive adhesive (the same applies to protection members 92 to 95 described later).

Figure 39:
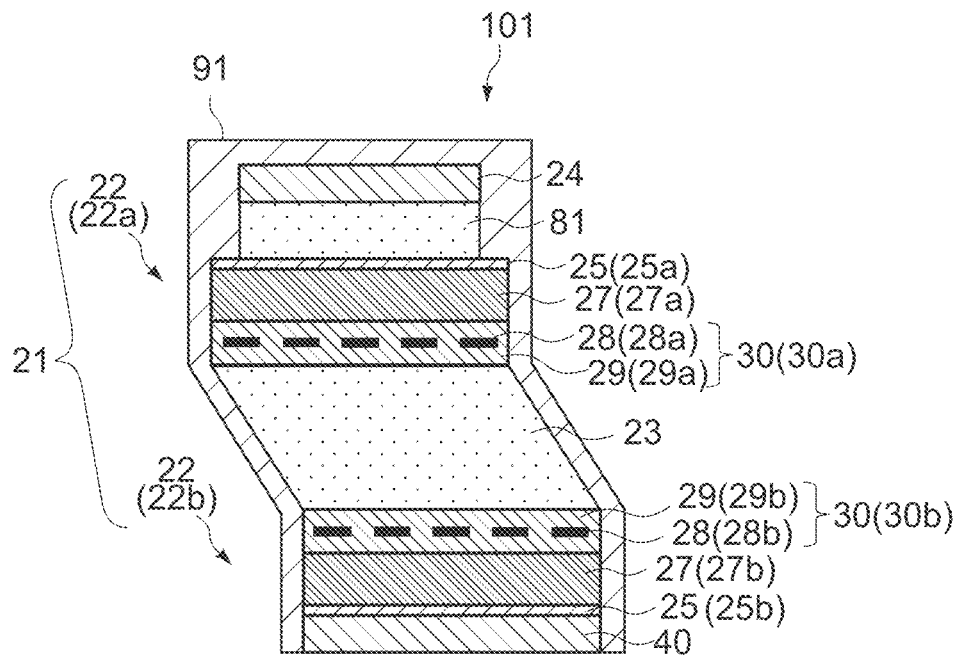
FIG. 39 is a schematic cross-sectional side view used to describe an action of the sensor apparatus.

The sensor apparatus 101 includes the protection member 301. This makes it possible to protect the sensor apparatus 101 from, for example, moisture in the outside air or moisture included in the surface of or the inside of a detection-target object when, for example, the viscoelastic body layer 81, the deformation layers 27 (27a and 27b) of the pressure sensors 22 (22a and 22b), and the separation layer 23 are made of a relatively highly hygroscopic material. Further, the protection member 301 is an elastic body that can follow an external force, and thus the protection member 91 is easily deformed due to external forces (a vertical load and a shearing force) that act on the surface layer 24. This also makes it possible to prevent a reduction in the accuracy in detection of a shearing force that is performed by the pressure sensor 22, as illustrated in, for example, FIG. 39.

Second Configuration Example

Figure 40:
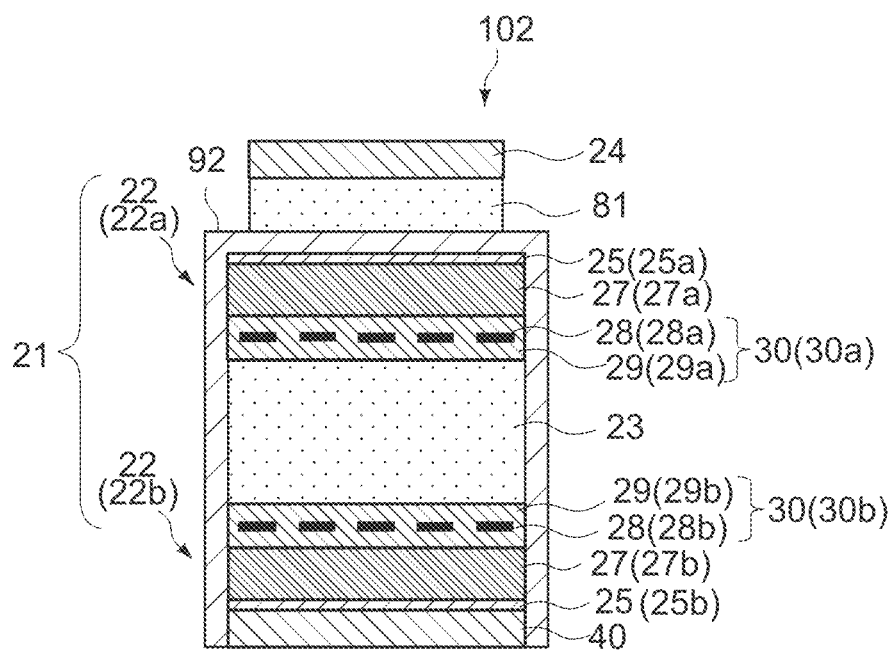
FIG. 40 is a schematic cross-sectional side view illustrating another configuration example of the sensor apparatus including a protection member.

A sensor apparatus 102 illustrated in FIG. 40 includes the protection member 92 covering the first pressure sensor 22a, the separation layer 23, the second pressure sensor 22b, and the support 40. The sensor apparatus 102 is different from the first configuration example in that the surface layer 24 and the viscoelastic body layer 81 are arranged on an upper surface of the protection member 92. For example, the sensor apparatus 102 can be adopted when the surface layer 24 and the viscoelastic body layer 81 are made of a waterproof material. Further, this configuration makes it possible to easily replace the surface layer 24 and the viscoelastic body layer 81.

Third Configuration Example

Figure 41:
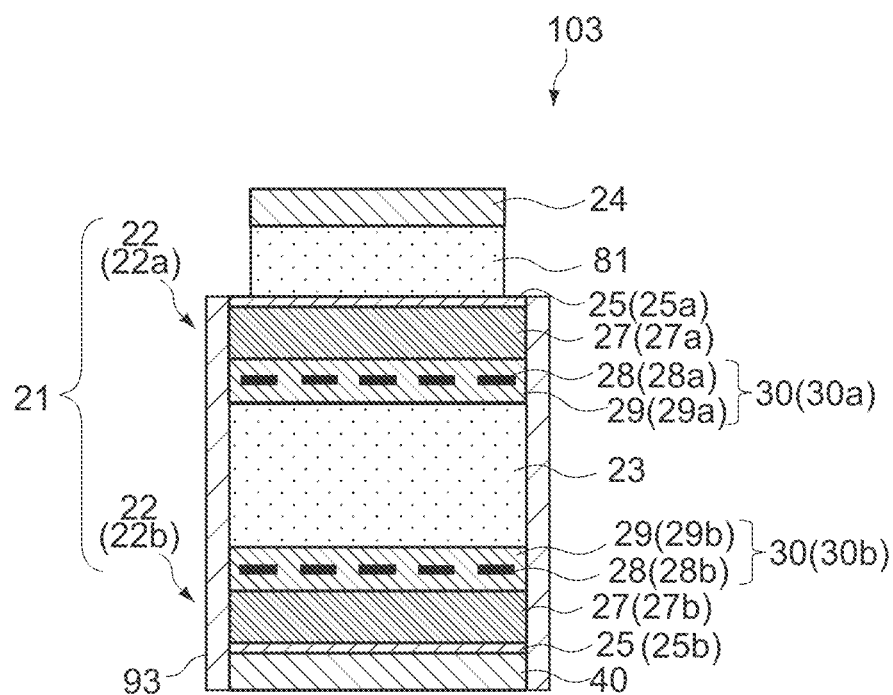
FIG. 41 is a schematic cross-sectional side view illustrating another configuration example of the sensor apparatus including a protection member.

A sensor apparatus 103 illustrated in FIG. 41 includes the protection member 93 covering the first pressure sensor 22a, the separation layer 23, the second pressure sensor 22b, and the support 40. The sensor apparatus 103 is different from the second configuration example in that the protection member 93 covers around (four lateral surfaces of each of) the separation layer 23, the second pressure sensor 22b, and the support 40. For example, the sensor apparatus 103 can be adopted when the surface layer 24 and the viscoelastic body layer 81 are made of a waterproof material, as in the second configuration example.

Fourth Configuration Example

Figure 42:
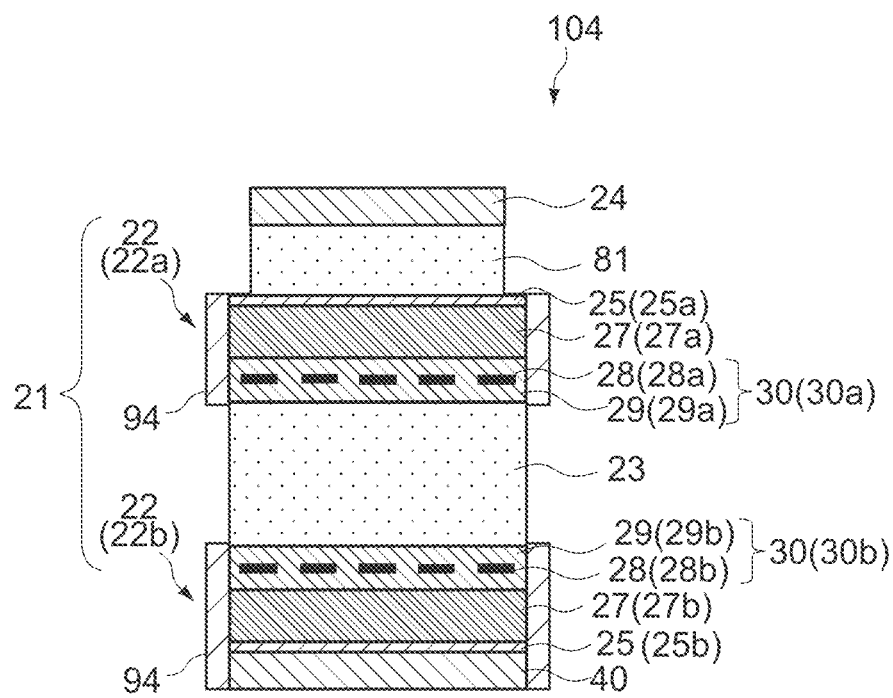
FIG. 42 is a schematic cross-sectional side view illustrating another configuration example of the sensor apparatus including a protection member.

A sensor apparatus 104 illustrated in FIG. 42 includes the protection member 94 covering each pressure sensor 22 (22a and 22b). The sensor apparatus 104 is different from the third configuration example in that the protection member 94 covers around (four lateral surfaces of) each pressure sensor 22. For example, this example can be adopted when the surface layer 24, the viscoelastic body layer 81, and the separation layer 23 are made of a waterproof material. Further, the protection member 94 may cover at least around the deformation layers 27 (27a and 27b) respectively included in the pressure sensors 22 (22a and 22b) when, for example, the deformation layers 27 are made of foam or each have a column structure.

Fifth Configuration Example

Figure 43:
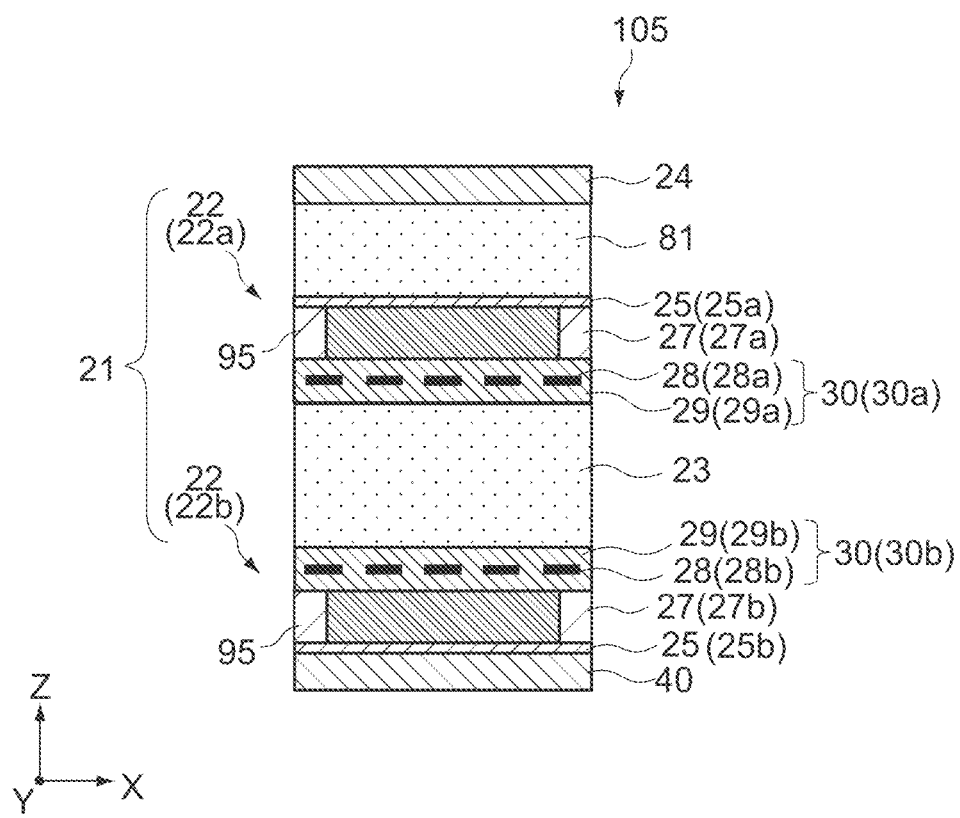
FIG. 43 is a set of a schematic cross-sectional side view and a schematic plan view that each illustrate another configuration example of the sensor apparatus including a protection member.
Figure 43:
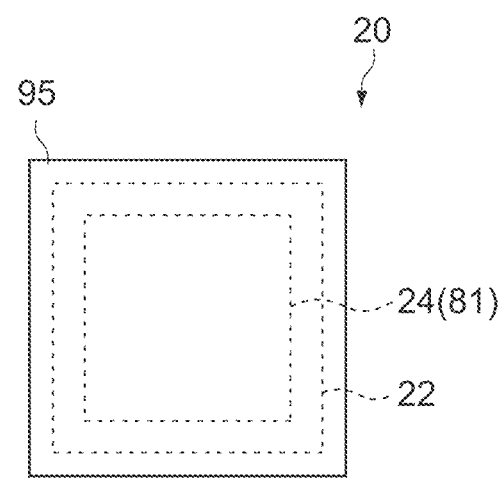

Other configuration examples of only covering the deformation layer 27 with the protection member are not limited to the example described above. For example, the protection member 95 formed into the shape of a frame may cover around the deformation layer 27, as in the case of a sensor apparatus 105 illustrated in FIG. 43. The protection member 95 is arranged between the reference electrode layer 25 (25a, 25b) and the sensor electrode layer 30 (30a, 30b), and the deformation layer 27 is arranged inside of the protection member 27. When the protection member 95 is formed into the shape of a frame used to accommodate the deformation layer 27, as described above, this makes it possible to, for example, reduce a dead zone (a ratio of an area for which the sensitivity can be detected), compared to the first configuration example.

Pressure Sensor

Figure 44:
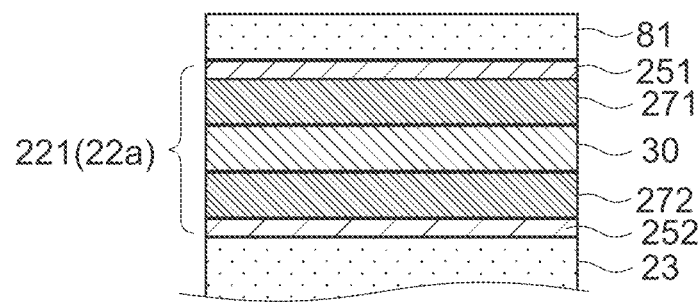
FIG. 44 is a schematic cross-sectional side view illustrating another configuration example of the pressure sensor.

The pressure sensor 22 may have a five-layer structure in which the deformation layer 27 and the reference electrode layer 25 are arranged in a layered formation on each of a front side and a rear side of the sensor electrode layer 30. For example, FIG. 44 illustrates a pressure sensor 221 that has a five-layer structure. The pressure sensor 221 includes the sensor electrode layer 30 including a plurality of capacitive elements arranged in the in-plane direction, a first reference electrode layer 251, a first deformation layer 271 that is arranged between a front surface of the sensor electrode layer 30 and the first reference electrode layer 35, a second reference electrode layer 252, and a second deformation layer 272 that is arranged between a back surface of the sensor electrode layer 30 and the second reference electrode layer 252. The reference electrode layer 252 is also arranged on a side of the back surface of the sensor electrode layer 30 through the deformation layer 272, and this results in increasing a change in capacitance in the sensor electrode layer 30 upon detecting pressure. This makes it possible to further increase the detection sensitivity of the pressure sensor 22.

Note that the second deformation layer 272 may be formed using a material that has a higher elastic modulus than a material of the first deformation layer 271. In other words, the second deformation layer 272 may be formed as a gap layer that forms a certain gap between the sensor electrode layer 30 and the second reference electrode layer 252.

The configuration described above can be applied to not only the first pressure sensor 22a situated on the front side, but also the second pressure sensor 22b situated on the rear side.

Figure 45:
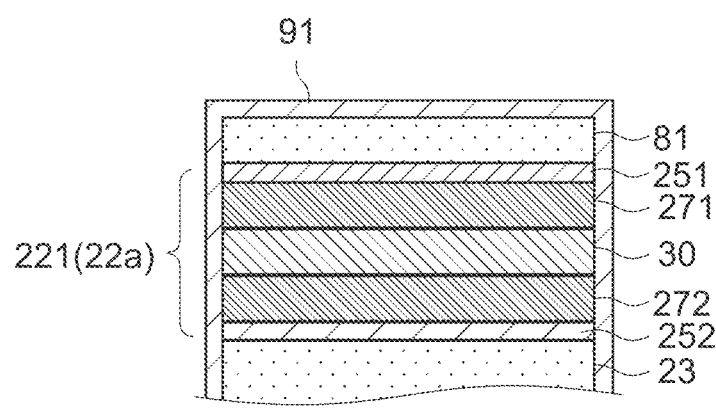
FIG. 45 is a schematic cross-sectional side view of the pressure sensor including the protection member.
Figure 46:
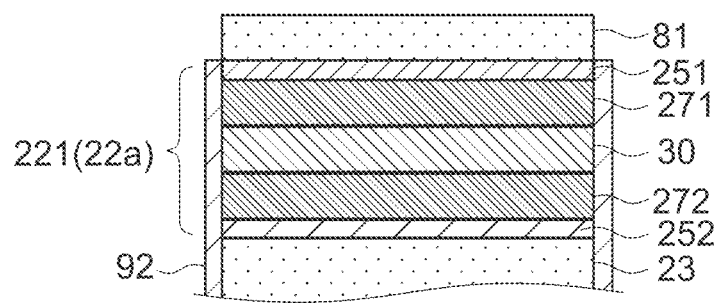
FIG. 46 is a schematic cross-sectional side view illustrating another configuration example of the pressure sensor including the protection member.
Figure 47:
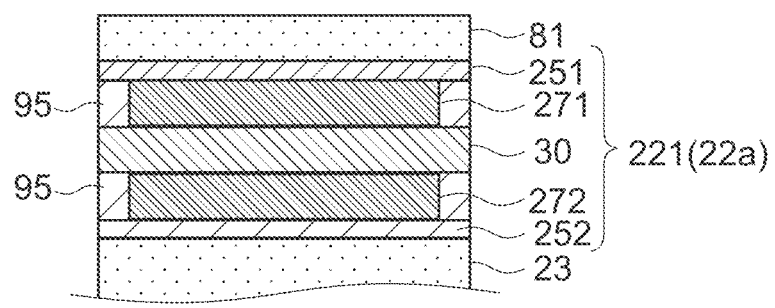
FIG. 47 is a schematic cross-sectional side view illustrating another configuration example of the pressure sensor including the protection member.

FIG. 45 is a cross-sectional view of a primary portion of the pressure sensor 221 that illustrates an example of applying the protection member 91 according to the above-described first configuration example to the pressure sensor 221. Likewise, FIG. 46 is a cross-sectional view of a primary portion of the pressure sensor 221 that illustrates an example of applying the protection member 92 according to the above-described second configuration example to the pressure sensor 221, and FIG. 47 is a cross-sectional view of a primary portion of the pressure sensor 221 that illustrates an example of applying the protection member 95 according to the above-described fifth configuration example to the pressure sensor 221. When the protection member covering at least around the deformation layer 27 is provided as described above, this makes it possible to improve the waterproof properties of the pressure sensor 221 and thus to improve the durability of the pressure sensor 221.

Modifications

The robotic apparatus 10 has been described above as an example of an apparatus that includes the sensor apparatus

20. On the other hand, the apparatus including the sensor apparatus 20 is not limited to a robotic apparatus, and may be an electronic apparatus such as a cellular phone (including a smartphone) or a PC. Typically, the present technology can be applied to any apparatus that includes the sensor apparatus 20.

The present technology may also take the following configurations.

(1) A sensor apparatus, including:
  a sensor section that includes a first pressure sensor situated on a front side of the sensor section, and a second pressure sensor situated on a rear side of the sensor section, the first pressure sensor and the second pressure sensor facing each other, the sensor section detecting a force applied in an in-plane direction, on the basis of a pressure detection position, in the in-plane direction, at which pressure is detected by the first pressure sensor, and on the basis of a pressure detection position, in the in-plane direction, at which pressure is detected by the second pressure sensor;
  a separation layer that is arranged between the first pressure sensor and the second pressure sensor, the separation layer being made of a viscoelastic material that is deformed by a load applied to the first pressure sensor; and
  a first viscoelastic body layer that is arranged on a front surface of the first pressure sensor, the first viscoelastic body layer being made of a viscoelastic material that is deformable on the first pressure sensor in the in-plane direction.

(2) The sensor apparatus according to (1), in which
  the first viscoelastic body layer has a thickness that is equal to or less than a thickness of the separation layer.

(3) The sensor apparatus according to (1) or (2), in which
  the first viscoelastic body layer exhibits a degree of hardness that is equal to or lower than a degree of hardness that is exhibited by the separation layer.

(4) The sensor apparatus according to any one of (1) to (3), in which
  a footprint of the first viscoelastic body layer with respect to the sensor section is equal to or smaller than a footprint of the separation layer with respect to the sensor section.

(5) The sensor apparatus according to any one of (1) to (4), in which
  each of the first pressure sensor and the second pressure sensor includes
    a sensor electrode layer that includes a plurality of capacitive elements arranged in the in-plane direction,
    a reference electrode layer, and
    a deformation layer that is arranged between the sensor electrode layer and the reference electrode layer.

(6) The sensor apparatus according to (5), in which
  capacitive elements of the plurality of capacitive elements in the first pressure sensor are arranged in a matrix with first spacing on a surface of the sensor electrode layer in the first pressure sensor, and
  capacitive elements of the plurality of capacitive elements in the second pressure sensor are arranged in a matrix with second spacing on a surface of the sensor electrode layer in the second pressure sensor, the second spacing being larger than the first spacing.

(7) The sensor apparatus according to (5) or (6), in which
  the first viscoelastic body layer is made of a viscoelastic material that is more easily deformed in the in-plane direction than the deformation layer.

(8) The sensor apparatus according to any one of (5) to (7), further including
  a waterproof protection member that covers at least around the deformation layer.

(9) The sensor apparatus according to (8), in which
  the protection member further covers around the separation layer.

(10) The sensor apparatus according to (8) or (9), in which
  the protection member further covers around the first viscoelastic body layer.

(11) The sensor apparatus according to any one of (1) to (10), further including
  a second viscoelastic body layer that is arranged on a back surface of the second pressure sensor, the second viscoelastic body layer being made of a viscoelastic material that is deformable on the second pressure sensor in the in-plane direction.

(12) The sensor apparatus according to (11), in which
  the second viscoelastic body layer has a thickness that is equal to or less than a thickness of the first viscoelastic body layer.

(13) The sensor apparatus according to any one of (1) to (12), in which
  at least one of the separation layer or the first viscoelastic body layer includes a plurality of pillar portions each being formed by gaps and extending in a direction vertical to the in-plane direction.

(14) The sensor apparatus according to (13), in which
  the gap is provided in the form of a groove that does not pass through the separation layer or the first viscoelastic body layer in the direction vertical to the in-plane direction.

(15) The sensor apparatus according to (13) or (14), in which
  the gap is provided in the form of a hole that passes through the separation layer or the first viscoelastic body layer in the direction vertical to the in-plane direction.

(16) The sensor apparatus according to any one of (1) to (15), in which
  the sensor section further includes a computation element that calculates a distribution of a shearing force applied in the in-plane direction, on the basis of the pressure detection position, in the in-plane direction, at which pressure is detected by the first pressure sensor, and on the basis of the pressure detection position, in the in-plane direction, at which pressure is detected by the second pressure sensor.

(17) The sensor apparatus according to (16), in which
  the computation element determines whether there is a shearing force on the basis of whether an amount of shift caused in the in-plane direction between a first pressure center position and a second pressure center position reaches a value that is equal to or greater than a specified value, the first pressure center position being a position at which a pressure center is detected by the first pressure sensor, the second pressure center position being a position at which a pressure center is detected by the second pressure sensor.

(18) The sensor apparatus according to any one of (1) to (17), in which
  each of the first pressure sensor and the second pressure sensor is divided into a plurality of detection regions.

(19) The sensor apparatus according to (18), in which
  the plurality of detection regions includes a certain region of which a portion overlaps a portion of another detection region that is included in the plurality of detection regions and adjacent to the certain region.

(20) A robotic apparatus, including
a sensor apparatus that includes
a sensor section that includes a first pressure sensor situated on a front side of the sensor section, and a second pressure sensor situated on a rear side of the sensor section, the first pressure sensor and the second pressure sensor facing each other, the sensor section detecting a force applied in an in-plane direction, on the basis of a pressure detection position, in the in-plane direction, at which pressure is detected by the first pressure sensor, and on the basis of a pressure detection position, in the in-plane direction, at which pressure is detected by the second pressure sensor,
a separation layer that is arranged between the first pressure sensor and the second pressure sensor, the separation layer being made of a viscoelastic material that is deformed by a load applied to the first pressure sensor, and
a viscoelastic body layer that is arranged on a front surface of the first pressure sensor, the viscoelastic body layer being made of a viscoelastic material that is deformable on the first pressure sensor in the in-plane direction.
(21) A pressure sensor, including:
a sensor electrode layer that includes a plurality of capacitive elements arranged in an in-plane direction;
a first reference electrode layer;
a first deformation layer that is arranged between a front surface of the sensor electrode layer and the first reference electrode layer;
a second reference electrode layer;
a second deformation layer that is arranged between a back surface of the sensor electrode layer and the second reference electrode layer; and
a waterproof protection member that covers at least around the first and second deformation layers.

REFERENCE SIGNS LIST 10 robotic apparatus
20, 50, 60, 70, 101, 102, 103, 104, 105 sensor apparatus
21 sensor section
22, 221 pressure sensor
23, 230 separation layer
24 surface layer
25 reference electrode apparatus
27 deformation layer
28 sensing section
30 sensor electrode layer
33 gap
34 pillar portion
70 computation element
81, 810 viscoelastic body layer (first viscoelastic body layer)
82 second viscoelastic body layer
91, 92, 93, 94, 95 protection member

What is claimed is:

1. A sensor apparatus, comprising:
a sensor section that includes a first pressure sensor situated on a front side of the sensor section, and a second pressure sensor situated on a rear side of the sensor section, the first pressure sensor and the second pressure sensor facing each other, the sensor section detecting a force applied in an in-plane direction, on a basis of a pressure detection position, in the in-plane direction, at which pressure is detected by the first pressure sensor, and on a basis of a pressure detection position, in the in-plane direction, at which pressure is detected by the second pressure sensor;
a separation layer that is arranged between the first pressure sensor and the second pressure sensor, the separation layer being made of a viscoelastic material that is deformed by a load applied to the first pressure sensor; and
a first viscoelastic body layer that is arranged on a front surface of the first pressure sensor, the first viscoelastic body layer being made of a viscoelastic material that is deformable on the first pressure sensor in the in-plane direction.

2. The sensor apparatus according to claim 1, wherein the first viscoelastic body layer has a thickness that is equal to or less than a thickness of the separation layer.

3. The sensor apparatus according to claim 1, wherein the first viscoelastic body layer exhibits a degree of hardness that is equal to or lower than a degree of hardness that is exhibited by the separation layer.

4. The sensor apparatus according to claim 1, wherein a footprint of the first viscoelastic body layer with respect to the sensor section is equal to or smaller than a footprint of the separation layer with respect to the sensor section.

5. The sensor apparatus according to claim 1, wherein each of the first pressure sensor and the second pressure sensor includes
a sensor electrode layer that includes a plurality of capacitive elements arranged in the in-plane direction,
a reference electrode layer, and
a deformation layer that is arranged between the sensor electrode layer and the reference electrode layer.

6. The sensor apparatus according to claim 5, wherein capacitive elements of the plurality of capacitive elements in the first pressure sensor are arranged in a matrix with first spacing on a surface of the sensor electrode layer in the first pressure sensor, and
capacitive elements of the plurality of capacitive elements in the second pressure sensor are arranged in a matrix with second spacing on a surface of the sensor electrode layer in the second pressure sensor, the second spacing being larger than the first spacing.

7. The sensor apparatus according to claim 5, wherein the first viscoelastic body layer is made of a viscoelastic material that is more easily deformed in the in-plane direction than the deformation layer.

8. The sensor apparatus according to claim 5, further comprising
a waterproof protection member that covers at least around the deformation layer.

9. The sensor apparatus according to claim 8, wherein the protection member further covers around the separation layer.

10. The sensor apparatus according to claim 8, wherein the protection member further covers around the first viscoelastic body layer.

11. The sensor apparatus according to claim 1, further comprising
a second viscoelastic body layer that is arranged on a back surface of the second pressure sensor, the second viscoelastic body layer being made of a viscoelastic material that is deformable on the second pressure sensor in the in-plane direction.

12. The sensor apparatus according to claim 11, wherein the second viscoelastic body layer has a thickness that is equal to or less than a thickness of the first viscoelastic body layer.

13. The sensor apparatus according to claim 1, wherein at least one of the separation layer or the first viscoelastic body layer includes a plurality of pillar portions each being formed by gaps and extending in a direction vertical to the in-plane direction.

14. The sensor apparatus according to claim 13, wherein the gap is provided in the form of a groove that does not pass through the separation layer or the first viscoelastic body layer in the direction vertical to the in-plane direction.

15. The sensor apparatus according to claim 13, wherein the gap is provided in the form of a hole that passes through the separation layer or the first viscoelastic body layer in the direction vertical to the in-plane direction.

16. The sensor apparatus according to claim 1, wherein the sensor section further includes a computation element that calculates a distribution of a shearing force applied in the in-plane direction, on the basis of the pressure detection position, in the in-plane direction, at which pressure is detected by the first pressure sensor, and on the basis of the pressure detection position, in the in-plane direction, at which pressure is detected by the second pressure sensor.

17. The sensor apparatus according to claim 16, wherein the computation element determines whether there is a shearing force on a basis of whether an amount of shift caused in the in-plane direction between a first pressure center position and a second pressure center position reaches a value that is equal to or greater than a specified value, the first pressure center position being a position at which a pressure center is detected by the first pressure sensor, the second pressure center position being a position at which a pressure center is detected by the second pressure sensor.

18. A robotic apparatus, comprising
a sensor apparatus that includes
  a sensor section that includes a first pressure sensor situated on a front side of the sensor section, and a second pressure sensor situated on a rear side of the sensor section, the first pressure sensor and the second pressure sensor facing each other, the sensor section detecting a force applied in an in-plane direction, on a basis of a pressure detection position, in the in-plane direction, at which pressure is detected by the first pressure sensor, and on a basis of a pressure detection position, in the in-plane direction, at which pressure is detected by the second pressure sensor,
  a separation layer that is arranged between the first pressure sensor and the second pressure sensor, the separation layer being made of a viscoelastic material that is deformed by a load applied to the first pressure sensor, and
  a first viscoelastic body layer that is arranged on a front surface of the first pressure sensor, the first viscoelastic body layer being made of a viscoelastic material that is deformable on the first pressure sensor in the in-plane direction.

\* \* \* \* \*